(12) United States Patent
Cheng et al.

(10) Patent No.: US 11,791,649 B2
(45) Date of Patent: Oct. 17, 2023

(54) CHARGING SYSTEM AND ELECTRIC VEHICLE

(71) Applicant: Huawei Digital Power Technologies Co., Ltd., Shenzhen (CN)

(72) Inventors: Yang Cheng, Xi'an (CN); Xueliang Zhang, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/580,841

(22) Filed: Jan. 21, 2022

(65) Prior Publication Data

US 2022/0209565 A1    Jun. 30, 2022

(30) Foreign Application Priority Data

Jan. 21, 2021   (CN) .......................... 202110082141.2

(51) Int. Cl.
| | |
|---|---|
| *H02J 7/00* | (2006.01) |
| *H02P 27/06* | (2006.01) |
| *H02M 7/5387* | (2007.01) |
| *B60L 53/20* | (2019.01) |
| *B60L 53/53* | (2019.01) |
| *B60L 53/62* | (2019.01) |

(Continued)

(52) U.S. Cl.
CPC ........ *H02J 7/007182* (2020.01); *B60L 15/20* (2013.01); *B60L 53/20* (2019.02); *B60L 53/53* (2019.02); *B60L 53/62* (2019.02); *B60L 58/10* (2019.02); *H02J 7/0042* (2013.01); *H02J 7/0063* (2013.01); *H02M 7/5387* (2013.01); *H02P 27/06* (2013.01); *B60L 2210/12* (2013.01); *B60L 2210/42* (2013.01); *H02J 2207/20* (2020.01)

(58) Field of Classification Search
CPC .. H02J 7/002; H02J 7/025; H02J 7/027; H02J 7/045; H02J 7/04; H02J 50/12; H02J 7/35; H02J 7/02; H02M 7/00; H02M 7/483
See application file for complete search history.

(56) References Cited

U.S. PATENT DOCUMENTS

| | | | |
|---|---|---|---|
| 10,505,455 B1 | 12/2019 | Biskup et al. | |
| 2002/0070715 A1 | 6/2002 | Sasaki et al. | |

FOREIGN PATENT DOCUMENTS

| | | | |
|---|---|---|---|
| CN | 105691217 A | 6/2016 | |
| CN | 108111022 A | 6/2018 | |

(Continued)

*Primary Examiner* — Elim Ortiz
(74) *Attorney, Agent, or Firm* — Rimon PC

(57) ABSTRACT

This application provides a charging system and an electric vehicle. The charging system mainly includes an MCU and a motor. N bridge arms in the MCU and N motor windings in the motor are multiplexed to constitute a voltage conversion circuit. When a power supply voltage is less than a minimum charging voltage of a power battery, the MCU may perform boost conversion on the power supply voltage by using the voltage conversion circuit, and output the power supply voltage obtained after boost conversion to the power battery as a first output voltage, where the first output voltage is not less than the minimum charging voltage. In this application, space occupied by the charging system and costs of the charging system can be reduced while the charging system is used to perform boost conversion on the power supply voltage.

6 Claims, 17 Drawing Sheets

(51) Int. Cl.
*B60L 58/10* (2019.01)
*B60L 15/20* (2006.01)

(56) References Cited

FOREIGN PATENT DOCUMENTS

| | | | | |
|---|---|---|---|---|
| CN | 108725235 | A | 11/2018 | |
| CN | 109121460 | A | 1/2019 | |
| CN | 110015112 | A | 7/2019 | |
| CN | 110386006 | A | 10/2019 | |
| CN | 110971173 | A | 4/2020 | |
| CN | 111267650 | A | 6/2020 | |
| CN | 111347887 | A | 6/2020 | |
| CN | 111347893 | A | 6/2020 | |
| CN | 111864820 | A | 10/2020 | |
| CN | 112937337 | A | 6/2021 | |
| CN | 115065240 | A | 9/2022 | |
| DE | 4107391 | A * | 9/1992 | .......... B60L 11/1803 |
| DE | 4107391 | A1 | 9/1992 | |
| DE | 102011081725 | A1 | 2/2013 | |
| DE | 102017123346 | A1 | 4/2019 | |
| DE | 102017222554 | A1 | 6/2019 | |
| DE | 102017222554 | A1 * | 6/2019 | |
| DE | 102018207188 | A1 | 11/2019 | |
| DE | 102018207188 | A1 * | 11/2019 | .............. B60L 53/11 |
| EP | 3238979 | A1 | 11/2017 | |
| EP | 3238979 | A1 * | 11/2017 | .............. B60K 6/26 |
| EP | 3487029 | A1 | 5/2019 | |
| KR | 20190119778 | A | 10/2019 | |

* cited by examiner

CHARGING SYSTEM AND ELECTRIC VEHICLE

CROSS-REFERENCE TO RELATED APPLICATIONS

This application claims priority to Chinese Patent Application No. 202110082141.2, filed on Jan. 21, 2021, which is hereby incorporated by reference in its entirety.

TECHNICAL FIELD

This application relates to the field of new energy vehicle technologies, and in particular, to a charging system and an electric vehicle.

BACKGROUND

With the development of new energy technologies, electric vehicles have received increasingly more attention. A power battery is disposed in the electric vehicle, and the power battery can receive and store electric energy provided by a charging pile, and when the electric vehicle travels, the power battery releases the stored electrical energy to drive the electric vehicle.

To improve a charging speed of the electric vehicle, increasingly more electric vehicles use an 800 V high-voltage power battery. A charging voltage required by the high-voltage power battery is usually not less than 800 V. However, currently, most fast direct current charging piles in the market have an output voltage of 500 V. These charging piles cannot directly charge the 800 V high-voltage power battery. As a result, it is difficult to charge the electric vehicle equipped with the high-voltage power battery, which is not conducive to improvement in user experience.

Therefore, currently, a charging solution to the electric vehicle needs to be further studied.

SUMMARY

In view of this, this application provides a charging system and an electric vehicle. When a power supply voltage is less than a minimum charging voltage of a power battery, the electric vehicle can still support the power supply voltage in charging the power battery.

According to a first aspect, this application provides a charging system, mainly including a motor control unit (MCU) and a motor. The MCU includes N bridge arms, the motor includes N motor windings, the N bridge arms in the MCU are respectively connected to the N motor windings in the motor in a one-to-one correspondence, and N is an integer greater than or equal to one. High-potential ends of the N bridge arms are connected to a first power supply end and a first battery end of the charging system, the first power supply end may be connected to a positive electrode of a direct current power supply, the first battery end may be connected to a positive electrode of a power battery, the direct current power supply may output a power supply voltage, and the power battery may receive a first output voltage of the charging system. In the MCU, low-potential ends of the N bridge arms are connected to a second battery end of the charging system, and the second battery end may be connected to a negative electrode of the power battery. In the motor, one end of each of the N motor windings is connected to a middle point of a corresponding bridge arm, the other end of each of the N motor windings is connected to a second power supply end of the charging system, and the second power supply end may be connected to a negative electrode of the direct current power supply. The N bridge arms and the N motor windings may constitute a voltage conversion circuit. When the power supply voltage is less than a minimum charging voltage of the power battery, the MCU may perform boost conversion on the power supply voltage by using the voltage conversion circuit, and output the power supply voltage obtained after boost conversion to the power battery as the first output voltage, where the first output voltage is not less than the minimum charging voltage.

In conclusion, in this application, the MCU and the motor are multiplexed to implement a charging system. When the power supply voltage is less than the minimum charging voltage of the power battery, the charging system may perform boost conversion on the power supply voltage to obtain the first output voltage that is not less than the minimum charging voltage. In this way, the first output voltage can be adapted to the power battery, to charge the power battery. In addition, in this application, the common MCU and motor in an electric vehicle are multiplexed, which further helps reduce space occupied by the charging system and costs of the charging system.

For example, the first aspect of this application provides the following examples for description.

Example 1

Any of the N bridge arms is a first bridge arm, and the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. When the power supply voltage is less than the minimum charging voltage of the power battery, the MCU may turn on the first switch transistor, so that a first motor winding correspondingly connected to the first bridge arm is charged; and the MCU turns off the first switch transistor, so that the first motor winding discharges electricity.

Specifically, when the MCU turns on the first switch transistor, current is output from the positive electrode of the direct current power supply, and reaches the first motor winding after passing through the first switch transistor, so that the first motor winding is charged. When the MCU turns off the first switch transistor, the first motor winding starts to discharge electricity. The current is output from an end that is of the first motor winding and that is close to the second power supply end, and flows back to an end that is of the first motor winding and that is close to the second switch transistor after being transmitted by the direct current power supply, the power battery, and a diode in the second switch transistor. In this process, the direct current power supply and the first motor winding are connected in series to discharge electricity, and the first output voltage is the sum of the power supply voltage and a voltage of the first motor winding. It is clear that the first output voltage is greater than the power supply voltage. Therefore, boost conversion can be implemented.

It can be understood that the power supply voltage provided by the direct current power supply may fall within a charging voltage range of the power battery, that is, the power supply voltage is adapted to the power battery. To be compatible with this scenario, the charging system in this application may further include a first switch. A first end of the first switch is connected to the second battery end, and a second end of the first switch is connected to the second power supply end. The MCU may further turn on the first switch when the power supply voltage fails within the charging voltage range of the power battery, and turn off the first switch when the power supply voltage is beyond the charging voltage range of the power battery.

Specifically, when the first switch is turned on, the power battery can be directly connected to the direct current power supply. Therefore, the power battery can directly receive the power supply voltage provided by the direct current power supply to complete charging. Therefore, the first switch may be turned on when the power supply voltage falls within the charging voltage range of the power battery. When the first switch is turned off, the MCU may convert the power supply voltage, and provide the converted power supply voltage to the power battery as the first output voltage. Therefore, the first switch may be turned off when the power supply voltage is beyond the charging voltage range of the power battery.

As described above, when boost conversion is performed, the first motor winding needs to store electric energy. However, in some motors, inductance of motor windings may be insufficient to support boost conversion. In view of this, the charging system in this application further includes a first inductor. One end of the first inductor is connected to the other end of each of the N motor windings, and the other end of the first inductor is connected to the second power supply end. When the first motor winding is charged, the first inductor is simultaneously charged. When the first motor winding discharges electricity, the first inductor simultaneously discharges electricity. In this case, the first output voltage is the sum of the power supply voltage, the voltage of the first motor winding, and a voltage of the first inductor. Therefore, adding the first inductor helps further increase the first output voltage.

Example 2

It is foreseeable that in some scenarios, the power supply voltage may be greater than a maximum charging voltage of the power battery. In view of this, in this application, when the power supply voltage is greater than the maximum charging voltage of the power battery, the MCU may further perform buck conversion on the power supply voltage by using the voltage conversion circuit, and output the power supply voltage obtained after buck conversion to the power battery as the first output voltage, where the first output voltage is not greater than the maximum charging voltage. In this case, the electric vehicle can receive a relatively large power supply voltage. After the power supply voltage is converted, the converted power supply voltage charges the power battery. Therefore, this helps improve charging convenience.

For example, any of the N bridge arms in the MCU is a first bridge arm, and the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. The charging system may further include a first switch and a second switch. A first end of the first switch is connected to the second battery end, a second end of the first switch is connected to the second power supply end, a first end of the second switch is connected to the first battery end, a second end of the second switch is connected to the other end of each of the N motor windings, and a third end of the second switch is connected to the first power supply end.

Based on the charging system, when the power supply voltage is greater than the maximum charging voltage of the power battery, the MCU may turn on the first switch, and turn on the first end and the second end of the second switch; the MCU turns on the first switch transistor, so that a first motor winding correspondingly connected to the first bridge arm is charged; and the MCU turns off the first switch transistor, so that the first motor winding discharges electricity.

Specifically, after the MCU turns on the first switch transistor, the first motor winding can be charged. In this case, the first output voltage is a voltage difference obtained after a voltage of the first motor winding is subtracted from the power supply voltage. After the MCU turns off the first switch transistor, the first motor winding can discharge electricity. In this case, the first output voltage is the voltage of the first motor winding. It can be learned that the first output voltage is always less than the power supply voltage. Therefore, the charging system can perform buck conversion on the power supply voltage.

It should be noted that the charging system provided in Example 2 may also perform boost conversion on the power supply voltage. For example, the charging system may further include a third switch. A first end of the third switch is connected to the other end of each of the N motor windings, and a second end of the third switch is connected to the second power supply end. When the power supply voltage is less than the minimum charging voltage of the power battery, the MCU may turn on the first end and the third end of the second switch, turn on the third switch, and turn off the first switch; the MCU turns on the first switch transistor, so that the first motor winding corresponding to the first bridge arm is charged; and the MCU turns off the first switch transistor, so that the first motor winding discharges electricity.

Specifically, after the MCU turns on the first switch transistor, the first motor winding can be charged. After the MCU turns off the first switch transistor, the first motor winding can discharge electricity. In this case, the first output voltage is the sum of the voltage of the first motor winding and the power supply voltage. It can be learned that the first output voltage is greater than the power supply voltage. Therefore, the charging system can perform boost conversion on the power supply voltage.

In addition, the charging system provided in Example 2 may also perform buck-boost (buck-boost) conversion on the power supply voltage. For example, the charging system may further include a third switch. A first end of the third switch is connected to the other end of each of the N motor windings, and a second end of the third switch is connected to the second power supply end. The MCU may turn on the first end and the second end of the second switch, and turn on the third switch; the MCU turns on the first switch transistor, so that a first motor winding correspondingly connected to the first bridge arm is charged; and the MCU turns off the first switch transistor, so that the first motor winding discharges electricity.

Specifically, after the MCU turns on the first switch transistor, the first motor winding can be charged, After the MCU turns off the first switch transistor, the first motor winding can discharge electricity. In this case, the first output voltage is the voltage of the first motor winding. The voltage of the first motor winding depends on charging duration of the first motor winding. Therefore, the first output voltage can be adjusted by adjusting the charging duration of the first motor winding. The first output voltage may be greater than the power supply voltage (boost conversion), or may be less than the power supply voltage (buck conversion).

It can be understood that the charging system provided in Example 2 in this application may also be compatible with a scenario in which the power supply voltage matches the power battery. For example, when the power supply voltage falls within a charging voltage range of the power battery, the MCU may further turn on the first end and the third end of the second switch, and turn on the first switch. In this case, the power battery is directly connected to the direct current power supply, and can directly receive the power supply voltage to complete charging.

According to a second aspect, this application further provides a charging system, mainly including a motor control unit MCU and a motor. The MCU includes N bridge arms, the motor includes N motor windings, the N bridge arms are respectively connected to the N motor windings in a one-to-one correspondence, and N is an integer greater than or equal to one. High-potential ends of the N bridge arms are connected to a first power supply end and a first battery end of the charging system, the first power supply end may be connected to a positive electrode of a direct current load, the first battery end may be connected to a positive electrode of a power battery, the direct current load may receive a second output voltage of the charging system, and the power battery may output a battery voltage to the charging system. Low-potential ends of the N bridge arms are connected to a second battery end of the charging system, and the second battery end may be connected to a negative electrode of the power battery. One end of each of the N motor windings is connected to a middle point of a corresponding bridge arm, the other end of each of the N motor windings is connected to a second power supply end of the charging system, and the second power supply end is configured to connect to a negative electrode of the direct current load. The N bridge arms and the N motor windings constitute a voltage conversion circuit. When the battery voltage is greater than a maximum working voltage of the direct current load, the MCU may perform buck conversion on the battery voltage by using the voltage conversion circuit, and output the battery voltage obtained after buck conversion to the direct current load as the second output voltage, where the second output voltage is not greater than the maximum working voltage.

In conclusion, in this application, the MCU and the motor are multiplexed to implement a charging system. When the battery voltage is greater than the maximum working voltage of the direct current load, the charging system may perform buck conversion on the battery voltage to obtain the second output voltage that is not greater than the maximum working voltage. In this way, the second output voltage can be adapted to the direct current load, to provide power to the direct current load. In addition, in this application, the common MCU and motor in an electric vehicle are multiplexed, which further helps reduce space occupied by the charging system and costs of the charging system.

For example, the second aspect of this application provides the following examples for description.

Example 1

For example, any of the N bridge arms is a first bridge arm, and the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. When the battery voltage is greater than the maximum working voltage of the direct current load, the MCU may turn on the second switch transistor, so that a first motor winding correspondingly connected to the first bridge arm is charged; and the MCU turns off the second switch transistor, so that the first motor winding discharges electricity.

Specifically, after the MCU turns on the second switch transistor, the first motor winding can be charged. In this case, the second output voltage is a voltage difference obtained after a voltage of the first motor winding is subtracted from the battery voltage. After the MCU turns off the second switch transistor, the first motor winding can discharge electricity. In this case, the first output voltage is the voltage of the first motor winding. It can be learned that the first output voltage is always less than the battery voltage. Therefore, the charging system provided in Example 1 in this application can implement buck conversion on the battery voltage.

It can be understood that the battery voltage of the power battery may be adapted to the direct current load. To be compatible with this scenario, the charging system may further include a first switch. A first end of the first switch is connected to the second battery end, and a second end of the first switch is connected to the second power supply end. The MCU may further turn on the first switch when the battery voltage falls within a working voltage range of the direct current load, and turn off the first switch when the battery voltage is beyond the working voltage range of the direct current load.

When the first switch is turned on, the power battery can be directly connected to the direct current load, and can directly provide power to the direct current load. When the first switch is turned off, the MCU may convert the battery voltage, and provide the converted battery voltage to the direct current load as the second output voltage.

As described above, when buck conversion is performed, the first motor winding needs to store electric energy. However, in some motors, inductance of motor windings may be insufficient to support buck conversion. In view of this, the charging system in this application further includes a first inductor. One end of the first inductor is connected to the other end of each of the N motor windings, and the other end of the first inductor is connected to the second power supply end. When the first motor winding is charged, the first inductor is simultaneously charged. When the first motor winding discharges electricity, the first inductor simultaneously discharges electricity. In this case, the first output voltage is a voltage difference obtained after the voltage of the first motor winding and a voltage of the first inductor are subtracted from the power supply voltage. Therefore, adding the first inductor helps further decrease the second output voltage.

Example 2

It is foreseeable that in some scenarios, the battery voltage may be less than a minimum working voltage of the direct current load. In view of this, in this application, when the battery voltage is less than the minimum working voltage of the direct current load, the MCU may further perform boost conversion on the battery voltage by using the voltage conversion circuit, and output the battery voltage obtained after boost conversion to the direct current load as the second output voltage, where the second output voltage is not less than the minimum working voltage of the direct current load.

For example, any of the N bridge arms in the MCU is a first bridge arm, and the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. The charging system may further include a first switch and a second switch. A first end of the first switch is connected to the second battery end, a second end of the first switch is connected to the second power supply end, a first end of the second switch is connected to the first battery end, a second end of the second switch is connected to the other end of each of the N motor windings, and a third end of the second switch is connected to the first power supply end.

Based on the charging system, when the battery voltage is less than the minimum working voltage of the direct current load, the MCU may turn on the first switch, and turn on the first end and the second end of the second switch; turn on the second switch transistor, so that a first motor winding correspondingly connected to the first bridge arm is charged; and turn off the second switch transistor, so that the first motor winding discharges electricity.

Specifically, after the MCU turns on the second switch transistor, the first motor winding can be charged. After the MCU turns off the second switch transistor, the first motor winding can discharge electricity. In this case, the second output voltage is the sum of the battery voltage and a voltage of the first motor winding. It can be learned that the second output voltage is greater than the battery voltage. Therefore, the charging system can perform boost conversion on the battery voltage.

It should be noted that the charging system provided in Example 2 may also perform buck conversion on the battery voltage. For example, the charging system may further include a third switch. A first end of the third switch is connected to the other end of each of the N motor windings, and a second end of the third switch is connected to the second power supply end. When the battery voltage is greater than the maximum working voltage of the direct current load, the MCU may turn on the first end and the third end of the second switch, turn on the third switch, and turn off the first switch; the MCU turns on the second switch transistor, so that the first motor winding corresponding to the first bridge arm is charged; and the MCU turns off the second switch transistor, so that the first motor winding discharges electricity.

Specifically, after the MCU turns on the second switch transistor, the first motor winding can be charged. In this case, the second output voltage is a voltage difference obtained after the voltage of the first motor winding is subtracted from the battery voltage. After the MCU turns off the second switch transistor, the first motor winding can discharge electricity. In this case, the second output voltage is the voltage of the first motor winding. It can be learned that the second output voltage is always less than the battery voltage. Therefore, the charging system can perform buck conversion on the battery voltage.

In addition, the charging system provided in Example 2 may also perform buck-boost conversion on the battery voltage. For example, the charging system may further include a third switch. A first end of the third switch is connected to the other end of each of the N motor windings, and a second end of the third switch is connected to the second power supply end. The MCU may turn on the first end and the second end of the second switch, and turn on the third switch; the MCU turns on the second switch transistor, so that the first motor winding correspondingly connected to the first bridge arm is charged; and the MCU turns off the second switch transistor, so that the first motor winding discharges electricity.

Specifically, after the MCU turns on the second switch transistor, the first motor winding can be charged. After the MCU turns off the second switch transistor, the first motor winding can discharge electricity. In this case, the second output voltage is the voltage of the first motor winding. The voltage of the first motor winding depends on charging duration of the first motor winding. Therefore, the second output voltage can be adjusted by adjusting the charging duration of the first motor winding. The second output voltage may be greater than the battery voltage (boost conversion), or may be less than the battery voltage (buck conversion).

It can be understood that the charging system provided in Example 2 in this application may also be compatible with a scenario in which the battery voltage matches the direct current load. For example, when the battery voltage falls within a working voltage range of the direct current load, the MCU may further turn on the first end and the third end of the second switch, and turn on the first switch. In this case, the power battery is directly connected to the direct current load, and can directly provide power to the direct current load.

According to a third aspect, this application provides a charging system, mainly including a motor control unit MCU and a motor. The MCU includes N bridge arms, the motor includes N motor windings, the N bridge arms are respectively connected to the N motor windings in a one-to-one correspondence, and N is an integer greater than or equal to one. High-potential ends of the N bridge arms are connected to a first battery end of the charging system, the first battery end may be connected to a positive electrode of a power battery, and the power battery may receive a first output voltage of the charging system. Low-potential ends of the N bridge arms are connected to a second battery end and a second power supply end of the charging system, the second battery end may be connected to a negative electrode of the power battery, the second power supply end may be connected to a negative electrode of a direct current power supply, and the direct current power supply may output a power supply voltage. One end of each of the N motor windings is connected to a middle point of a corresponding bridge arm, the other end of each of the N motor windings is connected to a first power supply end of the charging system, and the first power supply end may be connected to a positive electrode of the direct current power supply. The N bridge arms and the N motor windings constitute a voltage conversion circuit. When the power supply voltage is less than a minimum charging voltage of the power battery, the MCU may perform boost conversion on the power supply voltage by using the voltage conversion circuit, and output the power supply voltage obtained after boost conversion to the power battery as the first output voltage, where the first output voltage is not less than the minimum charging voltage. When the power supply voltage is greater than a maximum charging voltage of the power battery, the MCU performs buck conversion on the power supply voltage by using the voltage conversion circuit, and outputs the power supply voltage obtained after buck conversion to the power battery as the first output voltage, where the first output voltage is not greater than the maximum charging voltage.

For example, any of the N bridge arms is a first bridge arm, and the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. The charging system further includes a fifth switch and a sixth switch. A first end of the fifth switch is connected to the second battery end, a second end of the fifth switch is connected to the low-potential ends of the N bridge arms, a third end of the fifth switch is connected to the other end of each of the N motor windings, a first end of the sixth switch is connected to the first battery end, and a second end of the sixth switch is connected to the first power supply end.

When the power supply voltage is greater than the maximum charging voltage of the power battery, the MCU may turn on the sixth switch, and turn on the first end and the third end of the fifth switch; the MCU turns on the second switch transistor, so that a first motor winding correspondingly connected to the first bridge arm is charged; and the MCU turns off the second switch transistor, so that the first motor winding discharges electricity.

Specifically, after the MCU turns on the second switch transistor, the first motor winding can be charged. In this case, the first output voltage is a voltage difference obtained after a voltage of the first motor winding is subtracted from the power supply voltage, After the MCU turns off the second switch transistor, the first motor winding can discharge electricity. In this case, the first output voltage is the voltage of the first motor winding. It can be learned that the first output voltage is always less than the power supply voltage. Therefore, the charging system can perform buck conversion on the power supply voltage.

It should be noted that the charging system provided in the third aspect of this application may also perform boost conversion on the power supply voltage. For example, the charging system may further include a fourth switch. A first end of the fourth switch is connected to the other end of each of the N motor windings, and a second end of the fourth switch is connected to the first power supply end. When the power supply voltage is less than the minimum charging voltage of the power battery, the MCU may turn on the first end and the second end of the fifth switch, turn on the fourth switch, and turn off the sixth switch; the MCU turns on the second switch transistor, so that the first motor winding corresponding to the first bridge arm is charged; and the MCU turns off the second switch transistor, so that the first motor winding discharges electricity.

Specifically, after the MCU turns on the second switch transistor, the first motor winding can be charged. After the MCU turns off the second switch transistor, the first motor winding can discharge electricity. In this case, the first output voltage is the sum of the voltage of the first motor winding and the power supply voltage. It can be learned that the first output voltage is greater than the power supply voltage. Therefore, the charging system can perform boost conversion on the power supply voltage.

In addition, the charging system provided in the third aspect of this application may also perform buck-boost conversion on the power supply voltage. For example, the charging system may further include a fourth switch. A first end of the fourth switch is connected to the other end of each of the N motor windings, and a second end of the fourth switch is connected to the first power supply end. The MCU may turn on the first end and the third end of the fifth switch, and turn on the fourth switch; the MCU turns on the second switch transistor, so that the first motor winding correspondingly connected to the first bridge arm is charged; and the MCU turns off the second switch transistor, so that the first motor winding discharges electricity.

Specifically, after the MCU turns on the second switch transistor, the first motor winding can be charged. After the MCU turns off the second switch transistor, the first motor winding can discharge electricity. In this case, the first output voltage is the voltage of the first motor winding. The voltage of the first motor winding depends on charging duration of the first motor winding. Therefore, the first output voltage can be adjusted by adjusting the charging duration of the first motor winding. The first output voltage may be greater than the power supply voltage (boost conversion), or may be less than the power supply voltage (buck conversion).

It can be understood that the charging system provided the third aspect of this application may also be compatible with a scenario in which the power supply voltage matches the power battery. For example, when the power supply voltage falls within a charging voltage range of the power battery, the MCU may further turn on the first end and the second end of the fifth switch, and turn on the sixth switch. In this case, the power battery is directly connected to the direct current power supply, and can directly receive the power supply voltage to complete charging.

According to a fourth aspect, this application provides a charging system, mainly including a motor control unit MCU and a motor. The MCU includes N bridge arms, the motor includes N motor windings, the N bridge arms are respectively connected to the N motor windings in a one-to-one correspondence, and N is an integer greater than or equal to one. High-potential ends of the N bridge arms are connected to a first battery end of the charging system, the first battery end may be connected to a positive electrode of a power battery, and the power battery may output a battery voltage to the charging system. Low-potential ends of the N bridge arms are connected to a second battery end and a second power supply end of the charging system, the second battery end may be connected to a negative electrode of the power battery, the second power supply end may be connected to a negative electrode of a direct current load, and the direct current load may receive a second output voltage of the charging system. One end of each of the N motor windings is connected to a middle point of a corresponding bridge arm, the other end of each of the N motor windings is connected to a first power supply end of the charging system, and the first power supply end may be connected to a positive electrode of the direct current load. The N bridge arms and the N motor windings constitute a voltage conversion circuit. When the battery voltage is greater than a maximum working voltage of the direct current load, the MCU may perform buck conversion on the battery voltage by using the voltage conversion circuit, and output the battery voltage obtained after buck conversion to the direct current load as the second output voltage, where the second output voltage is not greater than the maximum working voltage of the direct current load. In addition, when the battery voltage is less than a minimum working voltage of the direct current load, the MCU performs boost conversion on the battery voltage by using the voltage conversion circuit, and outputs the battery voltage obtained after boost conversion to the direct current load as the second output voltage, where the second output voltage is not less than the minimum working voltage of the direct current load.

For example, any of the N bridge arms in the MCU is a first bridge arm, and the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. The charging system may further include a fifth switch and a sixth switch. A first end of the fifth switch is connected to the second battery end, a second end of the fifth switch is connected to the low-potential ends of the N bridge arms, a third end of the fifth switch is connected to the other end of each of the N motor windings, a first end of the sixth switch is connected to the first battery end, and a second end of the sixth switch is connected to the first power supply end.

Based on the charging system, when the battery voltage is less than the minimum working voltage of the direct current load, the MCU may turn on the sixth switch, and turn on the first end and the third end of the fifth switch; the MCU turns on the first switch transistor, so that a first motor winding correspondingly connected to the first bridge arm is charged; and the MCU turns off the first switch transistor, so that the first motor winding discharges electricity.

Specifically, after the MCU turns on the first switch transistor, the first motor winding can be charged. After the MCU turns off the first switch transistor, the first motor winding can discharge electricity. In this case, the second output voltage is the sum of the battery voltage and a voltage of the first motor winding. It can be learned that the second output voltage is greater than the battery voltage. Therefore, the charging system can perform boost conversion on the battery voltage.

It should be noted that the charging system provided in the fourth aspect of this application may also perform buck conversion on the battery voltage. For example, the charging system may further include a fourth switch. A first end of the fourth switch is connected to the other end of each of the N motor windings, and a second end of the fourth switch is connected to the first power supply end. When the battery voltage is greater than the maximum working voltage of the direct current load, the MCU may turn on the first end and the second end of the fifth switch, turn on the fourth switch, and turn off the sixth switch; the MCU turns on the first switch transistor, so that the first motor winding corresponding to the first bridge arm is charged; and the MCU turns off the first switch transistor, so that the first motor winding discharges electricity.

Specifically, after the MCU turns on the first switch transistor, the first motor winding can be charged. In this case, the second output voltage is a voltage difference obtained after the voltage of the first motor winding is subtracted from the battery voltage. After the MCU turns off the first switch transistor, the first motor winding can discharge electricity. In this case, the second output voltage is the voltage of the first motor winding. It can be learned that the second output voltage is always less than the battery voltage. Therefore, the charging system can perform buck conversion on the battery voltage.

In addition, the charging system provided in the fourth aspect of this application may also perform buck-boost conversion on the battery voltage. For example, the charging system may further include a fourth switch. A first end of the fourth switch is connected to the other end of each of the N motor windings, and a second end of the fourth switch is connected to the first power supply end. The MCU may turn on the first end and the third end of the fifth switch, and turn on the sixth switch; the MCU turns on the first switch transistor, so that a first motor winding correspondingly connected to the first bridge arm is charged; and the MCU turns off the first switch transistor, so that the first motor winding discharges electricity.

Specifically, after the MCU turns on the first switch transistor, the first motor winding can be charged. After the MCU turns off the first switch transistor, the first motor winding can discharge electricity. In this case, the second output voltage is the voltage of the first motor winding. The voltage of the first motor winding depends on charging duration of the first motor winding. Therefore, the second output voltage can be adjusted by adjusting the charging duration of the first motor winding. The second output voltage may be greater than the battery voltage (boost conversion), or may be less than the battery voltage (buck conversion).

It can be understood that the charging system provided in the fourth aspect of this application may also be compatible with a scenario in which the battery voltage matches the direct current load. For example, when the battery voltage falls within a working voltage range of the direct current load, the MCU may further turn on the first end and the second end of the fifth switch, and turn on the sixth switch. In this case, the power battery is directly connected to the direct current load, and can directly provide power to the direct current load.

According to a fifth aspect, this application provides an electric vehicle, mainly including a power battery and the charging system provided in any one of the first aspect to the fourth aspect, where the charging system can charge the power battery.

These aspects or other aspects of this application are more readily apparent from the following description of embodiments.

DESCRIPTION OF EMBODIMENTS

To make objectives, technical solutions, and advantages of this application more clearly, the following further describes this application in detail with reference to the accompanying drawings. A specific operation method in a method embodiment may also be applied to an apparatus embodiment or a system embodiment. It should be noted that in the description of this application, "at least one" means one or more, and "a plurality of" means two or more. In view of this, "a plurality of" may also be understood as "at least two" in embodiments of the present invention. The term "and/or" describes an association relationship between associated objects and represents that three relationships may exist. For example, A and/or B may represent the following three cases: Only A exists, both A and B exist, and only B exists. In addition, unless otherwise specified, the character "/" usually indicates an "or" relationship between the associated objects. In addition, it should be understood that, in the description of this application, terms "first", "second", and the like are only used for a purpose of distinguishing between descriptions, but cannot be understood as an indication or implication of relative importance, and cannot be understood as an indication or implication of a sequence.

The following clearly describes the technical solutions in the embodiments of this application with reference to the accompanying drawings in the embodiments of this application.

Figure 1:
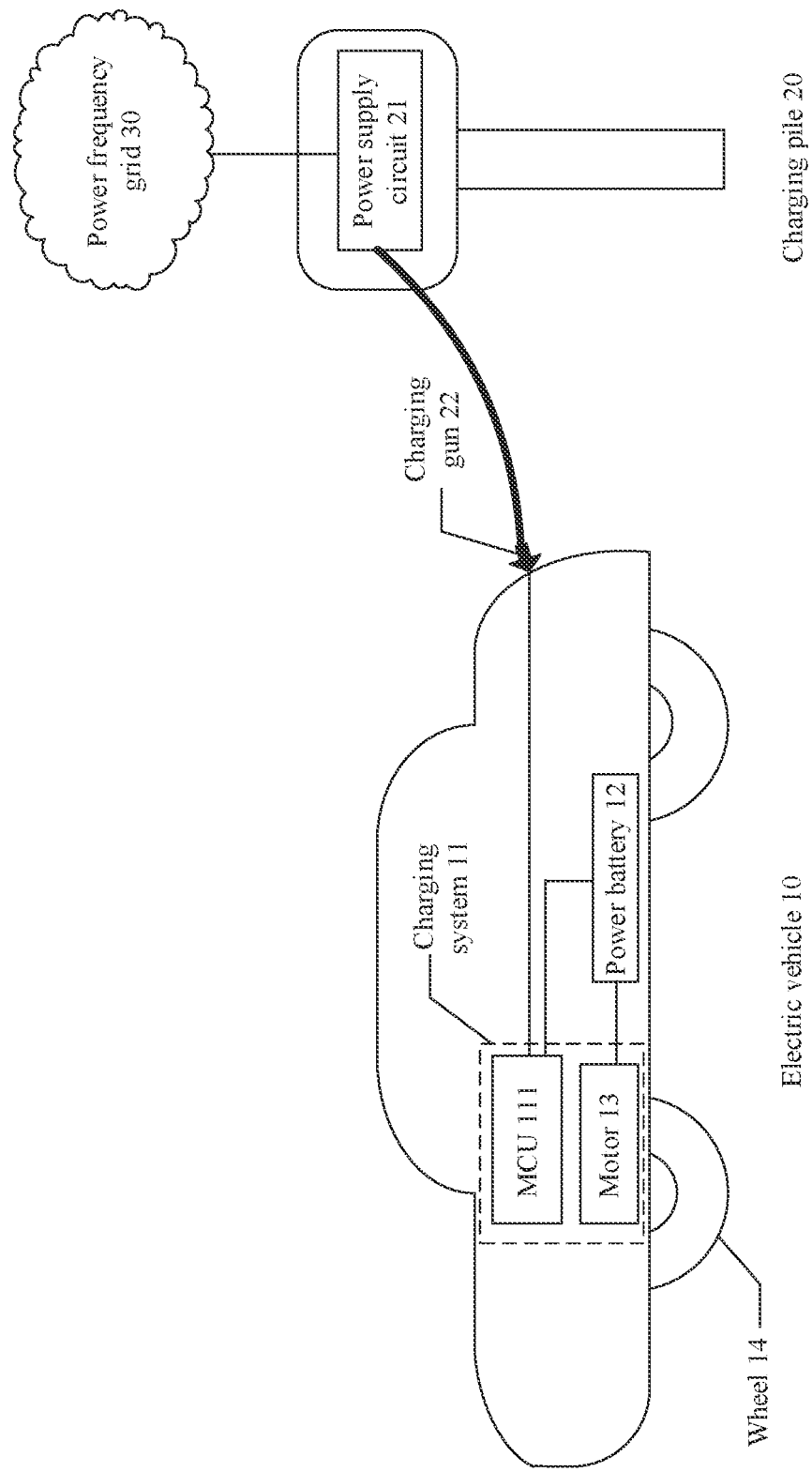
FIG. 1 is a schematic diagram of a charging scenario of an electric vehicle.

An electric vehicle, which may also be referred to as a new energy vehicle, is a vehicle driven by electric energy. As shown in FIG. 1, an electric vehicle 10 mainly includes a power battery 12, a motor 13, and a wheel 14. The power battery 12 is a battery with a large capacity and high power. When the electric vehicle 10 travels, the power battery 12 may provide power to the motor 13 by using a motor control unit (MCU) 111. The motor 13 converts electric energy provided by the power battery 12 into mechanical energy, to drive the wheel 14 to rotate, so that the vehicle travels.

When the electric vehicle 10 is charged, a charging pile 20 usually may be used to charge the electric vehicle 10. As shown in FIG. 1, the charging pile 20 mainly includes a power supply circuit 21 and a charging gun 22. One end of the power supply circuit 21 is connected to a power grid 30, and the other end of the power supply circuit 21 is connected to the charging gun 22 through a cable. Currently, most charging piles 20 are direct current charging piles, and the power supply circuit 21 may convert alternating current provided by the power grid 30 into direct current. An operator may insert the charging gun 22 into a charging socket of the electric vehicle 10, so that the charging gun 22 is connected to the power battery 12 in the electric vehicle 10, and then the power supply circuit 21 of the charging pile 20 can charge the power battery 12 by using the charging gun 22.

An output voltage of the charging pile 20 may be understood as a power supply voltage received by the electric vehicle 10. In a fast direct current charging scenario, the power supply voltage received by the electric vehicle 10 falls within a charging voltage range of the power battery 12, and the power battery 12 can directly use the output voltage of the charging pile 20 to complete charging.

A lower limit of the charging voltage range of the power battery 12 is a minimum charging voltage, and the minimum charging voltage may be understood as a minimum charging voltage value that can be adapted to the power battery 12. An upper limit of the charging voltage range of the power battery 12 is a maximum charging voltage, and the maximum charging voltage may be understood as a maximum charging voltage value that can be adapted to the power battery 12.

Currently, to improve a charging speed of the electric vehicle 10, a voltage level of the power battery 12 gradually increases from current 500 V to 800 V. Using the power battery 12 of an 800 V voltage level as an example, a battery voltage of the power battery 12 can reach 800 V, and a required charging voltage is usually not less than 800 V.

However, currently, voltage levels of charging piles 20 that support fast direct current charging in the market are usually 500 V, that is, maximum output voltages of most charging piles 20 that support fast direct current charging are 500 V. As a result, many electric vehicles 10 equipped with a high-voltage power battery face a difficulty being charged.

In view of this, the embodiments of this application provide a charging system 11, and the charging system 11 is connected to the power battery 12. When charging the electric vehicle 10, the charging system 11 may receive a power supply voltage. When the power supply voltage is less than the minimum charging voltage of the power battery 12, the charging system 11 may perform boost conversion on the power supply voltage, and provide the power supply voltage obtained after boost conversion to the power battery 12 as a first output voltage.

In the foregoing example, the output voltage of the charging pile 20 is 500 V, that is, the power supply voltage received by the charging system 11 is 500 V. Assuming that a charging voltage that can be adapted to the power battery 12 is 960 V, the charging system 11 may convert the power supply voltage into 960 V through boosting, to provide a 960 V first output voltage to the power battery 12, so that the power battery 12 can use the first output voltage to complete charging.

It should be noted that to reduce space occupied by the charging system 11 in the electric vehicle 10 and control costs of the charging system 11, the charging system 11 in the embodiments of this application may be implemented by multiplexing the MCU 111 in the electric vehicle 10 and a motor winding in the motor 13. The charging system 11 including the MCU 111 and the motor 13 may also be referred to as an electrical drive system of the electric vehicle 10.

Figure 2:
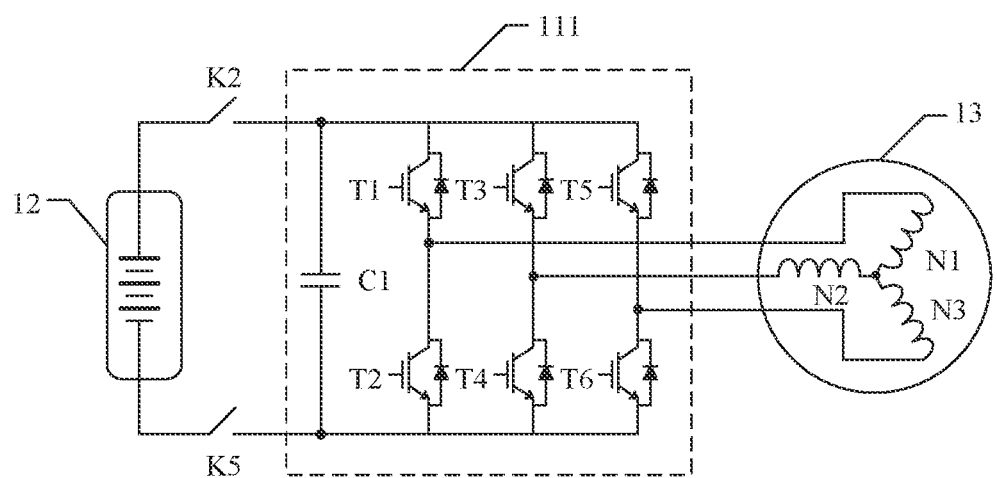
FIG. 2 is a schematic diagram of an electrical drive system.

Specifically, the motor 13 converts electric energy into mechanical energy based on an electromagnetic induction effect. Therefore, a motor winding is disposed in the motor 13. Currently, there are three or six motor windings in the motor 13. A three-phase motor is used as an example. As shown in FIG. 2, the MCU 111 includes three bridge arms, the motor 13 includes three motor windings (N1 to N3), and the three bridge arms in the MCU 111 are respectively connected to the three motor windings in the motor 13 in a one-to-one correspondence.

A first bridge arm includes a switch transistor T1 and a switch transistor T2. A first electrode of the switch transistor T1 is configured to connect to a positive electrode of the power battery 12, a second electrode of the switch transistor T1 is connected to a first electrode of the switch transistor T2, and a second electrode of the switch transistor T2 is configured to connect to a negative electrode of the power battery 12. A middle point of the first bridge arm is a point connecting the switch transistor T1 and the switch transistor T2. The middle point of the first bridge arm is connected to one end of the motor winding N1.

A second bridge arm includes a switch transistor T3 and a switch transistor T4. A first electrode of the switch transistor T3 is configured to connect to the positive electrode of the power battery 12, a second electrode of the switch transistor 13 is connected to a first electrode of the switch transistor T4, and a second electrode of the switch transistor T4 is configured to connect to the negative electrode of the power battery 12. A middle point of the second bridge arm is a point connecting the switch transistor T3 and the switch transistor T4. The middle point of the second bridge arm is connected to one end of the motor winding N2.

A third bridge arm includes a switch transistor T5 and a switch transistor T6. A first electrode of the switch transistor T5 is configured to connect to the positive electrode of the power battery 12, a second electrode of the switch transistor 15 is connected to a first electrode of the switch transistor T6, and a second electrode of the switch transistor T6 is configured to connect to the negative electrode of the power battery 12. A middle point of the third bridge arm is a point connecting the switch transistor 15 and the switch transistor T6. The middle point of the third bridge arm is connected to one end of the motor winding N3, and the other ends of the three motor windings are connected to each other.

The MCU 111 further includes a control board (not shown in the figure). The control board is separately connected to control electrodes of the switch transistor T1 to the switch transistor T6, to separately control the switch transistor T1 to the switch transistor T6 to be turned on and off, so that the three bridge arms can convert the battery voltage that is output by the power battery 12 into three-phase alternating current. Each bridge arm corresponds to one phase of the three-phase alternating current. The MCU 111 outputs the three-phase alternating current to the motor 13, so that the motor windings N1 to N3 generate a space rotational magnetic field, to drive a motor rotor to rotate, thereby converting electric energy into mechanical energy.

It should be noted that the switch transistor in the embodiments of this application may be one or more of a plurality of types of switch transistors such as a relay, a metal oxide semiconductor field effect transistor (MOSFET), a bipolar junction transistor (BJT), or an insulated gate bipolar transistor (IGBT), which are not enumerated one by one in the embodiments of this application. Each switch transistor may include a first electrode, a second electrode, and a control electrode. The control electrode is configured to control the switch transistor to be turned on and off. When the switch transistor is turned on, current may be transmitted between the first electrode and the second electrode of the switch transistor. When the switch transistor is turned off, the current cannot be transmitted between the first electrode and the second electrode of the switch transistor. The IGBT is used as an example. In the embodiments of this application, the first electrode of the switch transistor may be a collector electrode, the second electrode of the switch transistor may be an emitter electrode, and the control electrode of the switch transistor may be a gate electrode.

Generally, as shown in FIG. 2, a switch K2 and a switch K5 may be further disposed between the power battery 12 and the MCU 111. For example, the switch K2 and the switch K5 may be relays. The switch K2 and the switch K5 may be integrated with the power battery 12 in a battery pack, or may be independently disposed. This is not limited in the embodiments of this application.

One end of the switch K2 is connected to an anode of the power battery 12, and the other end of the switch K2 is connected to high-potential ends of the three bridge arms. One end of the switch K5 is connected to a cathode of the power battery 12, and the other end of the switch K5 is connected to low-potential ends of the three bridge arms. When the switch K2 and the switch K5 are turned on, the power battery 12 can provide power to the MCU 111. When the switch K2 and the switch K5 are turned off, the power battery 12 stops providing power to the MCU 111.

It can be learned from the foregoing description of the MCU 111 and the motor 13 that the MCU 111 includes N bridge arms, the motor 13 includes N motor windings, the N bridge arms are respectively connected to the N motor windings in a one-to-one correspondence, and N is an integer greater than or equal to one. It can be understood that when the electric vehicle 10 is charged, the electric vehicle 10 usually does not need to be moved. In other words, in this case, the MCU 111 does not need to provide the three-phase current to the motor 13. Therefore, in the embodiments of this application, the N bridge arms in the MCU and the N motor windings in the motor 13 may be multiplexed to charge the electric vehicle 10 without affecting a traveling function of the electric vehicle 10.

Next, the charging system 11 provided in the embodiments of this application is further described by using the following examples.

Embodiment 1

For example, a charging system 11 provided in the embodiments of this application includes an MCU 111 and a motor 13. The MCU 111 includes N bridge arms, the motor 13 includes N motor windings, the N bridge arms are respectively connected to the N motor windings in a one-to-one correspondence, and N is an integer greater than or equal to one.

Figure 3:
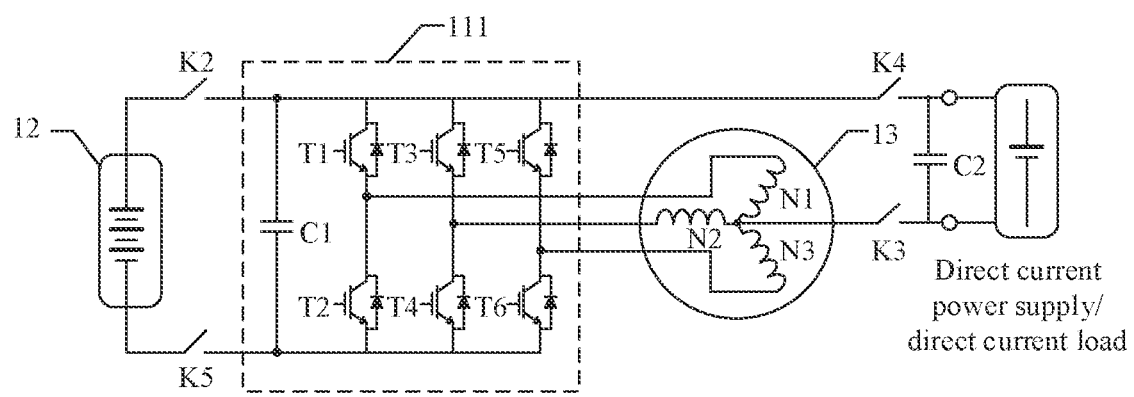
FIG. 3 is a schematic diagram of a charging system according to an embodiment of this application.

For example, N=3. As shown in FIG. 3, the charging system 11 includes the MCU 111 and the motor 13. A first battery end of the charging system 11 is connected to a positive electrode of the power battery 12, a second battery end of the charging system 11 is connected to a negative electrode of the power battery 12, a first power supply end of the charging system 11 is connected to a positive electrode of a direct current power supply, and a second power supply end of the charging system is connected to a negative electrode of the direct current power supply.

The direct current power supply may be a charging pile, another electric vehicle, or the like. This is not limited in this embodiment of this application. The direct current power supply may output a power supply voltage. The charging system 11 receives the power supply voltage by using the first power supply end and the second power supply end, converts the power supply voltage into a first output voltage adapted to the power battery 12, and outputs the first output voltage the power battery 12 by using the first battery end and the second battery end. The power battery 12 may receive the first output voltage provided by the charging system 11 to complete charging.

Specifically, as shown in FIG. 3, the MCU 111 includes three bridge arms, the motor 13 includes three motor windings (N1 to N3), and the three bridge arms in the MCU 111 are respectively connected to the motor windings N1 to N3 in a one-to-one correspondence. A specific connection manner is the same as that in FIG. 2, and details are not described herein again.

In this embodiment of this application, high-potential ends of the three bridge arms in the MCU 111 are further connected to the first power supply end, and a point connecting the motor windings N1 to N3 is further connected to the second power supply end. In this case, the three bridge antis in the MCU 111 and the motor windings N1 to N3 may constitute a voltage conversion circuit, so that the MCU 111 can control each of switch transistors T1 to T6 to be turned on and off, and the voltage conversion circuit converts the power supply voltage.

Therefore, when the power supply voltage is less than the minimum charging voltage of the power battery 12, the MCU 111 may perform boost conversion on the power supply voltage by using the voltage conversion circuit, and output the power supply voltage obtained after boost conversion to the power battery 12 as the first output voltage, where the first output voltage is not less than the minimum charging voltage of the power battery 12.

For example, the power supply voltage is 500 V, and the minimum charging voltage of the power battery 12 is 960 V. The MCU 111 may convert the power supply voltage into 960 V or above 960 V through boosting to provide an adaptive first output voltage to the power battery 12, so that the power battery 12 can complete charging.

Generally, as shown in FIG. 3, the charging system 11 further includes a switch K3 and a switch K4. The switch K3 and the switch K4 may also be referred to as fast contactors. One end of the switch K3 is connected to the point connecting the motor windings N1 to N3, and the other end of the switch K3 is connected to the second power supply end. One end of the switch K4 is connected to the high-potential ends of the three bridge arms, and the other end of the switch K4 is connected to the first power supply end. When the switch K3 and the switch K4 are turned on, the direct current power supply can provide power to the charging system 11. When the switch K3 and the switch K4 are turned off, the direct current power supply can stop providing power to the charging system 11.

Next, a bridge arm 3 including a switch transistor T5 and a switch transistor T6 is used as an example to further illustrate a boost conversion process. A middle point of the bridge arm 3 is a point connecting the switch transistor T5 and the switch transistor T6. The middle point of the bridge arm 3 is connected to one end of the motor winding N3, and the other end of the motor winding N3 is connected to the second power supply end. When boost conversion is performed on the power supply voltage, the following two stages are mainly included.

Stage 1: The Motor Winding N3 is Charged.

Figure 4:
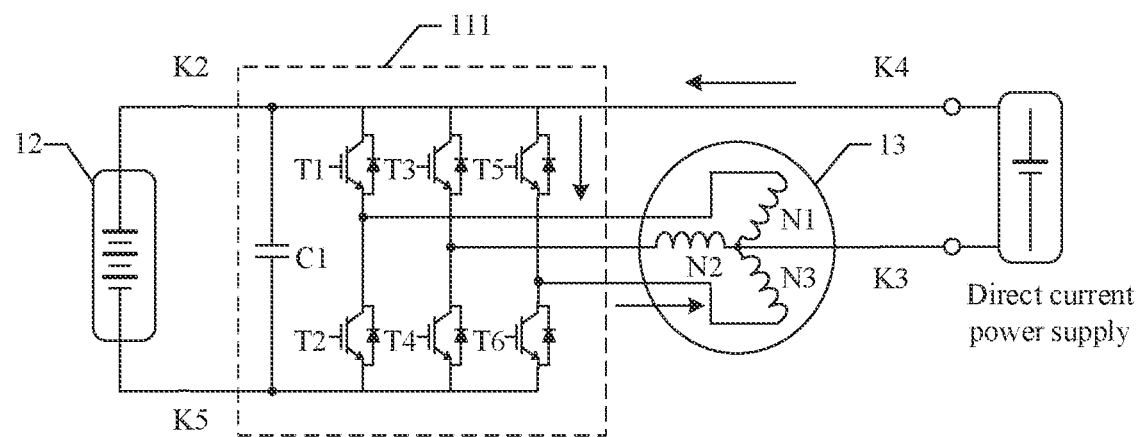
FIG. 4 shows a first boost conversion state of a charging system according to an embodiment of this application.

The MCU 111 may turn on the switch transistor T5, so that the motor winding N3 correspondingly connected to the bridge arm 3 is charged. It can be understood that in this case, the switch transistor T6 is turned off. As shown in FIG. 4, current is input from the first power supply end and reaches the motor winding N3 after passing through the switch transistor T5, so that the motor winding N3 is charged.

Stage 2: The Motor Winding N3 Discharges Electricity.

Figure 5:
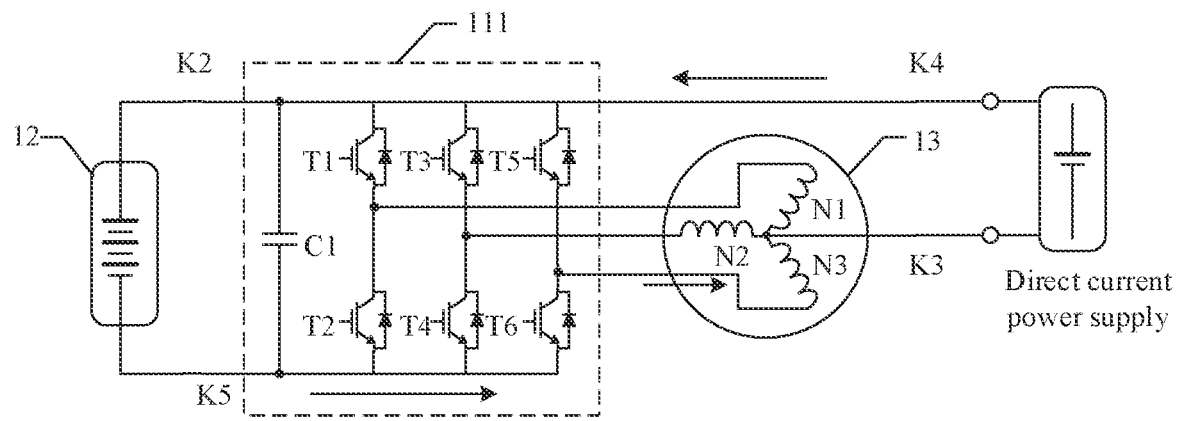
FIG. 5 shows a second boost conversion state of a charging system according to an embodiment of this application.

The MCU 111 may turn off the switch transistor T5, and the motor winding N3 cannot continue to receive the current through the switch transistor T5. The motor winding N3 starts to discharge electricity due to a freewheeling feature of an inductor. As shown in FIG. 5, the current is output from an end that is of the motor winding N3 and that is close to the second power supply end, and flows back to an end that is of the motor winding N3 and that is close to a second switch transistor after being transmitted by the direct current power supply, the power battery 12, and a diode in the switch transistor T6. In this process, the first output voltage of the charging system 11 is the sum of the power supply voltage of the direct current power supply and a voltage of the motor winding N3. It can be understood that the first output voltage is greater than the power supply voltage of the direct current power supply, so that boost conversion is implemented.

It can be understood that when power of the direct current power supply is relatively large, the MCU 111 may also synchronously control a plurality of bridge arms to perform boost conversion. For example, the MCU 111 may synchronously control a switch transistor T1, a switch transistor T3, and the switch transistor T5 to be turned on and off, so that the motor windings N1 to N3 are simultaneously charged and simultaneously discharge electricity. This case is equivalent to that the three motor windings work in parallel to support voltage conversion in a high power scenario.

In conclusion, the charging system 11 in this embodiment of this application may perform boost conversion on the power supply voltage of the direct current power supply to charge the high-voltage power battery 12, thereby helping improve convenience of charging the high-voltage power battery 12. In addition, in this embodiment of this application, the charging system 11 is implemented by multiplexing the N bridge arms in the MCU 111 and N motor windings in the motor 13, thereby further helping reduce space occupied by the charging system 11 and costs of the charging system 11.

It can be understood that the power supply voltage provided by the direct current power supply may fall within the charging voltage range of the power battery 12. For example, the charging voltage range of the power battery 12 is 700 V to 1000 V, and the power supply voltage of the direct current power supply (charging pile) is also 800 V. In this case, boost conversion does not need to be performed on the power supply voltage.

Figure 6:
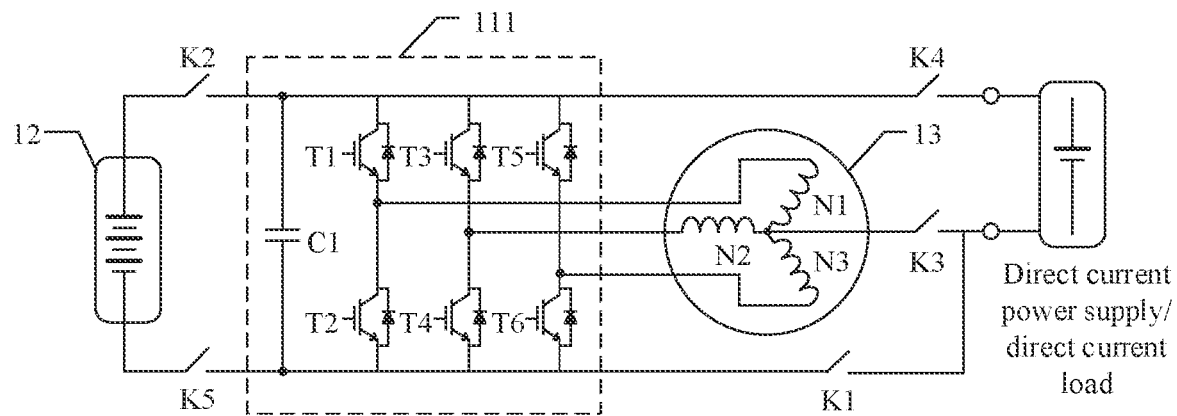
FIG. 6 is a schematic diagram of a specific charging system according to an embodiment of this application.

To be compatible with this scenario, as shown in FIG. 6, the charging system 11 provided in this embodiment of this application may further include a switch K1. A first end of the switch K1 is connected to the second battery end, and a second end of the switch K1 is connected to the second power supply end. The MCU 111 may control the switch K1 to be turned on and off. Specifically, the MCU 111 may turn on the switch K1 when the power supply voltage falls within the charging voltage range of the power battery 12, and turn off the switch K1 when the power supply voltage is beyond the charging voltage range of the power battery 12.

A scenario in which the power supply voltage falls within the charging voltage range of the power battery 12 may be a scenario in which the power supply voltage is equal to the minimum charging voltage of the power battery 12, may be a scenario in which the power supply voltage is equal to the maximum charging voltage of the power battery 12, or may be a scenario in which the power supply voltage is greater than the minimum charging voltage of the power battery 12 and is less than the maximum charging voltage of the power battery 12. A scenario in which the power supply voltage is beyond the charging voltage range of the power battery 12 may be a scenario in which the power supply voltage is less than the minimum charging voltage of the power battery 12, or may be a scenario in which the power supply voltage is greater than the maximum charging voltage of the power battery 12.

As shown in FIG. 6, when the power battery 12 is charged, a switch K5 is turned on by default. When the switch K1 is turned on, the power battery 12 can be directly connected to the direct current power supply, and therefore can directly receive the power supply voltage provided by the direct current power supply to complete charging. Therefore, the MCU 111 may turn on the switch K1 when the power supply voltage falls within the charging voltage range of the power battery 12.

When the switch K1 is turned off, the charging system 11 shown n FIG. 6 is equivalent to the charging system 11 shown in FIG. 3. The MCU 111 may perform boost conversion on the power supply voltage. Details are not described again.

In a possible implementation, as shown in FIG. 3, the charging system 11 may further include a filter capacitor C1. One end of the filter capacitor C1 is connected to the first battery end, and the other end of the filter capacitor C1 is connected to the second battery end. When the power battery 12 is charged, the filter capacitor C1 may filter the first output voltage.

Similarly, as shown in FIG. 3, the charging system 11 may further include a filter capacitor C2. One end of the filter capacitor C2 is connected to the first power supply end, and the other end of the filter capacitor C2 is connected to the second power supply end. When the power battery 12 is charged, the filter capacitor C2 may filter the received power supply voltage.

Figure 7:
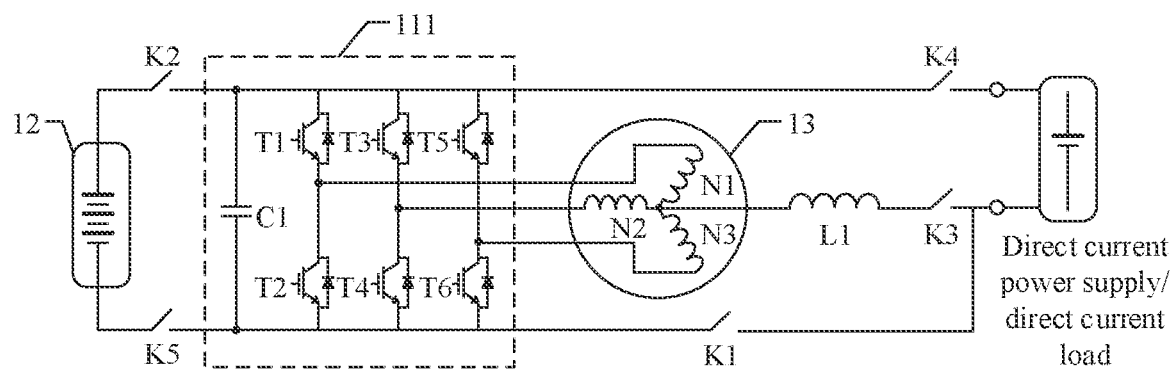
FIG. 7 is a schematic diagram of a specific charging system according to an embodiment of this application.

As described above, when boost conversion is performed, the motor windings N1 to N3 need to store electric energy. However, in some motors, inductance of the motor windings N1 to N3 may be insufficient to support boost conversion. In view of this, as shown in FIG. 7, the charging system 11 may further include an inductor L1. One end of the inductor L1 is connected to the point connecting the N motor windings, and the other end of the inductor L1 is connected to the second power supply end.

The motor winding N3 is used as an example. When the motor winding N3 is charged, the inductor L1 may also be charged. When the motor winding N3 discharges electricity, the inductor L1 may also be discharge electricity. In this case, the first output voltage of the charging system 11 is the sum of the power supply voltage, the voltage of the motor winding N3, and a voltage of the inductor L1. It can be learned that addition of the inductor L1 helps increase the first output voltage, so that the first output voltage can match the power battery 12.

Embodiment 2

With development of charging and discharging technologies of the electric vehicle 10, increasingly more electric vehicles 10 can also support a discharging function, that is, the electric vehicle 10 provides power to a direct current load. In some scenarios, the direct current load may be another electric vehicle. For example, as shown in FIG. 3, the first power supply end of the charging system 11 may be further connected to a positive electrode of the direct current load, and the second power supply end of the charging system 11 may be further connected to a negative electrode of the direct current load.

The power battery 12 may output the battery voltage to the charging system 11. When the battery voltage of the power battery 12 is greater than a maximum working voltage of the direct current load, the charging system 11 may perform buck conversion on the battery voltage, and output the battery voltage obtained after buck conversion to the direct current load as a second output voltage. The second output voltage is not greater than the maximum working voltage of the direct current load. When the direct current load is another electric vehicle, the maximum working voltage of the direct current load may be understood as a maximum charging voltage of a power battery in the other electric vehicle.

For example, if the battery voltage of the power battery 12 is 800 V and a working voltage range of the direct current load is 400 V to 600 V, the MCU 111 may perform buck conversion on the battery voltage to obtain the second output voltage falling within 400 V to 600 V. The charging system 11 outputs the second output voltage to the direct current load, to provide an adaptive voltage to the direct current load.

Next, a bridge arm 3 including a switch transistor T5 and a switch transistor T6 in FIG. 3 is used as an example to further illustrate a buck conversion process. It can be understood that in this case, the switches K2 to K5 are turned on, and details are not described again. When buck conversion is performed on the battery voltage, the following two stages are mainly included.

Stage 1: The Motor Winding N3 is Charged.

Figure 8:
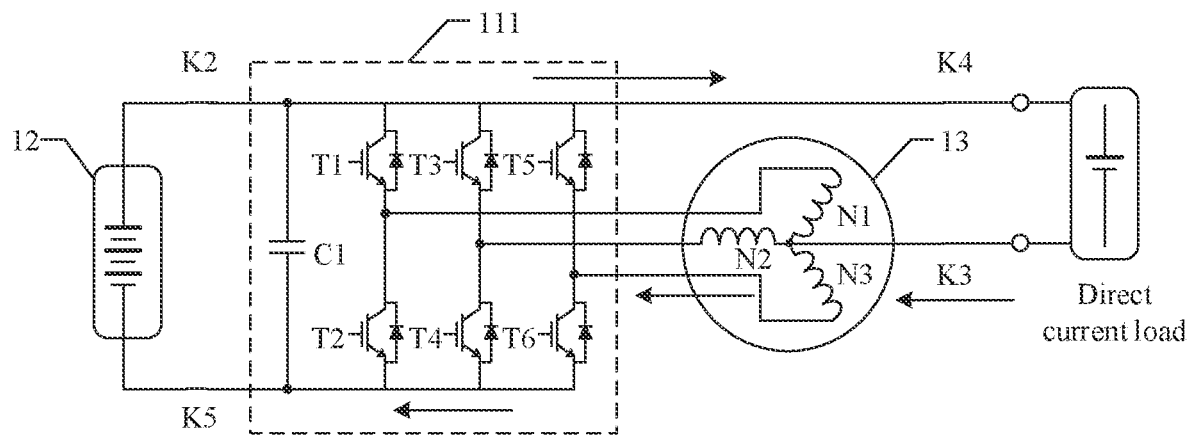
FIG. 8 shows a first buck conversion state of a charging system according to an embodiment of this application.

The MCU 111 turns on the switch transistor T6. In this case, the switch transistor T5 remains off. As shown in FIG. 8, current is output from the positive electrode of the power battery 12, and flows back to the negative electrode of the power battery 12 after being transmitted by the direct current load, the motor winding N3, and the switch transistor T6. In this stage, the motor winding N3 is charged. The second output voltage that is output by the charging system 11 is a difference obtained after the voltage of the motor winding N3 is subtracted from the battery voltage. It is clear that the second output voltage is less than the battery voltage. Therefore, the charging system 11 can implement buck conversion on the battery voltage.

Stage 2: The Motor Winding N3 Discharges Electricity.

Figure 9:
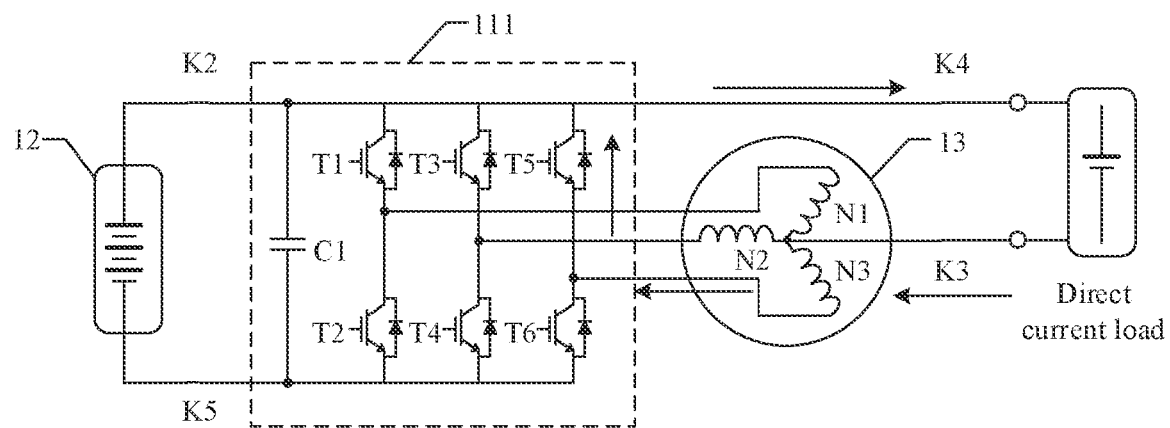
FIG. 9 shows a second buck conversion state of a charging system according to an embodiment of this application.

The MCU 111 may turn off the switch transistor T6, and the charging loop of the motor winding N3 is turned off. The motor winding N3 starts to discharge electricity due to a freewheeling feature of an inductor. As shown in FIG. 9, the current is output from an end that is of the motor winding N3 and that is close to the switch transistor T5, and flows back to an end that is of the motor winding N3 and that is close to the second power supply end after being transmitted by a diode in the switch transistor T5 and the direct current load. In this process, the second output voltage of the charging system 11 is the voltage of the motor winding N3. It is clear that the voltage of the motor winding N3 is less than the battery voltage. Therefore, the charging system 11 can implement buck conversion on the battery voltage.

It can be understood that when the output power of the power battery 12 is relatively large, the MCU 111 may also synchronously control a plurality of bridge arms to perform boost conversion. For example, the MCU 111 may synchronously control the switch transistor T2, the switch transistor T4, and the switch transistor T6 to be turned on and off, so that the motor windings N1 to N3 are simultaneously charged and simultaneously discharge electricity. This case is equivalent to that the three motor windings work in parallel to support voltage conversion in a high power scenario.

It should be noted that the charging system 11 shown in FIG. 6 and FIG. 7 is also applicable to buck conversion on the battery voltage, and details are not described again.

FIG. 6 is used as an example. When the battery voltage falls within a working voltage range of the direct current load, the MCU 111 may turn on the switch K1, so that the power battery 12 can directly provide power to the direct current load. When the battery voltage is beyond the working voltage range of the direct current load, the MCU 111 may turn off the switch K1, so that the MCU 111 can perform voltage conversion on the battery voltage.

A scenario in which the battery voltage falls within the working voltage range of the direct current load may be a scenario in which the battery voltage is equal to a minimum working voltage of the direct current load, may be a scenario in which the battery voltage is equal to a maximum working voltage of the direct current load, or may be a scenario in which the battery voltage is greater than the minimum working voltage of the direct current load and is less than the maximum working voltage of the direct current load. A scenario in which the battery voltage is beyond the working voltage range of the direct current load may be a scenario in which the battery voltage is less than the minimum working voltage of the direct current load, or may be a scenario in which the battery voltage is greater than the maximum working voltage of the direct current load.

Embodiment 3

As mentioned above, not only low-voltage charging piles but also high-voltage charging piles exists in the market. Not only a high-voltage power battery but also a low-voltage power battery may be configured in the electric vehicle 10. Therefore, it is also a common scenario in which a high-voltage charging pile charges a low-voltage power battery.

In view of this, an embodiment of this application further provides a charging system 1. A connection relationship between the charging system 11 and each of a direct current power supply and the power battery 12 is the same as that in the foregoing embodiment. Details are not described again. When a power supply voltage of the direct current power supply is greater than the maximum charging voltage of the power battery 12, the charging system 11 may perform buck conversion on the power supply voltage to provide a first output voltage that is not greater than the maximum charging voltage to the power battery 12. When the power supply voltage of the direct current power supply is less than the minimum charging voltage of the power battery 12, the charging system 11 may perform boost conversion on the power supply voltage to provide a first output voltage that is not less than the minimum charging voltage to the power battery 12.

Figure 10:
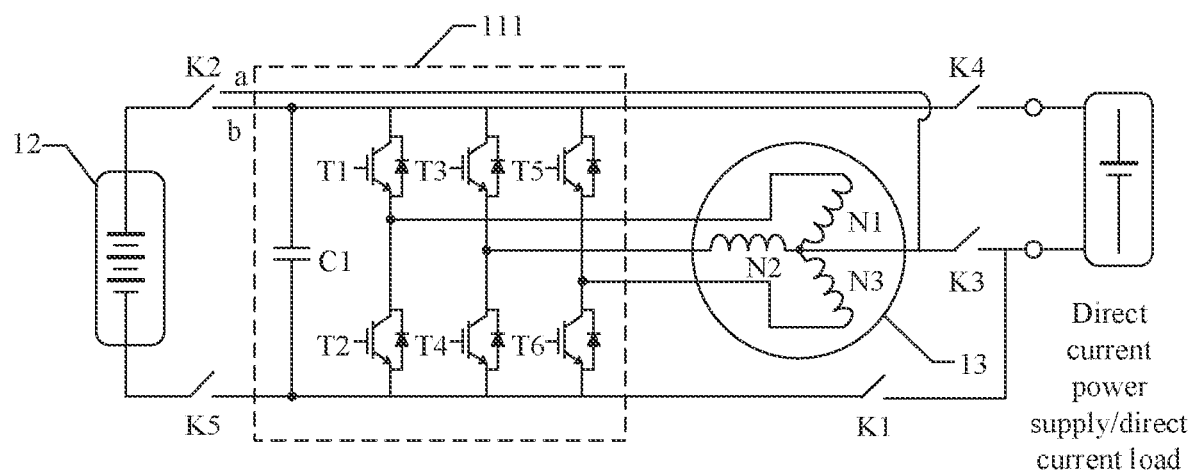
FIG. 10 is a schematic diagram of a specific charging system according to an embodiment of this application.

For example, as shown in FIG. 10, the charging system 11 in this embodiment of this application may be implemented by multiplexing N bridge arms in an MCU 111 and N motor windings in a motor 13. In FIG. 10, that N=3 is used as an example for representation. A circuit structure corresponding to the N bridge arms and the N motor windings are not described again. In addition, the charging system 11 may further include a switch K1 and a switch K2. A first end of the switch K1 is connected to a second battery end of the charging system 11, and a second end of the switch K1 is connected to a second power supply end. The switch K2 is a single-pole double-throw switch. A first end of the switch K2 is connected to a first battery end, a second end a of the switch K2 is connected to a point connecting the N motor windings, and a third end b of the switch K2 is connected to a first power supply end.

It should be noted that the switch K2 and the power battery 12 may be independently disposed. In this case, the first end of the switch K2 may be understood as the first battery end of the charging system 11. It can be understood that the switch K2 and the power battery 12 may be integrated into a power battery pack. In this case, it can be considered that the charging system 11 provided in this embodiment of this application includes two first battery ends, where one first battery end is connected to the second end a of the switch K2, and the other first battery end is connected to the third end b of the switch K2.

Next, buck conversion and boost conversion on the power supply voltage are separately described by using FIG. 10 as an example.

I. Buck Conversion

Figure 11:
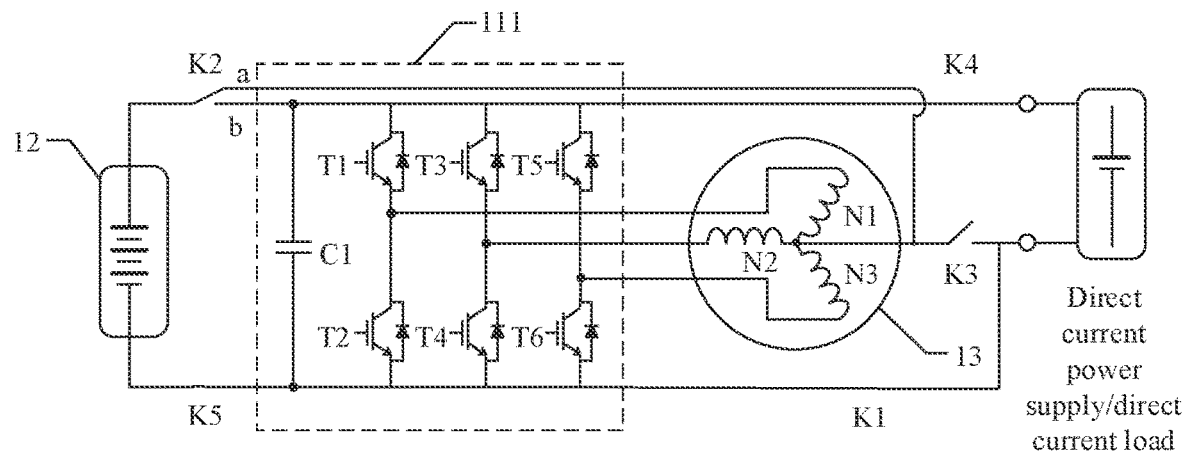
FIG. 11 shows a first switch state of a charging system according to an embodiment of this application.

In a buck conversion process, the MCU 111 may turn on the switch K1, and turn on the first end and the second end a of the switch K2. A circuit state may be shown in FIG. 11. It should be noted that in some scenarios, a switch K3 to a switch K5 may be further disposed in the charging system 11. In this case, the switch K4 and the switch K5 should remain on and the switch K3 should remain off. Based on the circuit slate shown in FIG. 11 and using a bridge arm 3 including a switch transistor T5 and a switch transistor T6 as an example, the buck conversion process mainly includes the following two stages.

Stage 1: The Motor Winding N3 is Charged.

Figure 12:
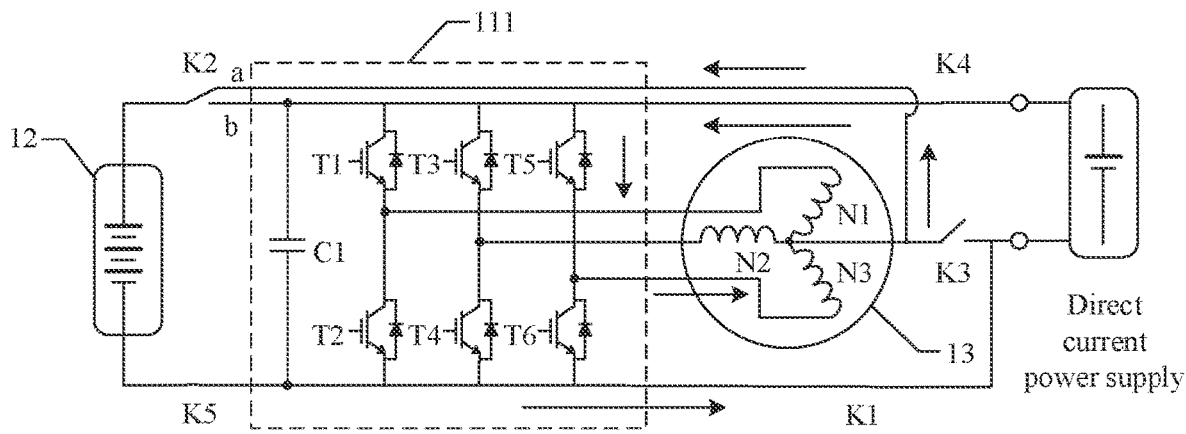
FIG. 12 shows a third buck conversion state of a charging system according to an embodiment of this application.

The MCU 111 turns on the switch transistor T5, so that the motor winding N3 is charged. As shown in FIG. 12, current is output from a positive electrode of the direct current power supply, and flows back to a negative electrode of the direct current power supply after being transmitted by the switch transistor T5, the motor winding N3, the switch K2, and the power battery 12, to form a charging loop to charge the motor winding N3. In this process, the first output voltage of the charging system 11 is a difference obtained after a voltage of the motor winding N3 is subtracted from the power supply voltage. It is clear that the first output voltage is less than the power supply voltage. Therefore, the charging system 11 can implement buck conversion.

Stage 2: The Motor Winding N3 Discharges Electricity.

Figure 13:
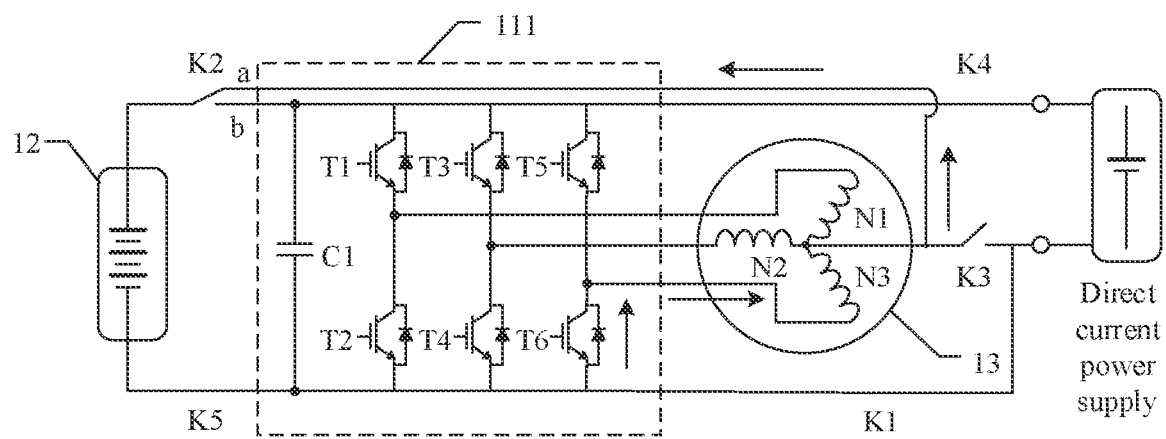
FIG. 13 shows a fourth buck conversion state of a charging system according to an embodiment of this application.

The MCU 111 turns off the switch transistor T5, so that the motor winding N3 discharges electricity. Specifically, after the MCU 111 turns off the switch transistor T5, the charging loop is turned off. The motor winding N3 discharges electricity due to a freewheeling feature of an inductor. As shown in FIG. 13, the current is output from an end that is of the motor winding N3 and that is close to the second power supply end, and flows back to an end that is of the motor winding N3 and that is close to the switch transistor T6 after being transmitted by the switch K2, the power battery 12, and a diode in the switch transistor T6. In this process, the first output voltage of the charging system 11 is the voltage of the motor winding N3. It is clear that the first output voltage is less than the power supply voltage. Therefore, the charging system 11 can implement buck conversion on the power supply voltage.

II. Boost Conversion

Figure 14:
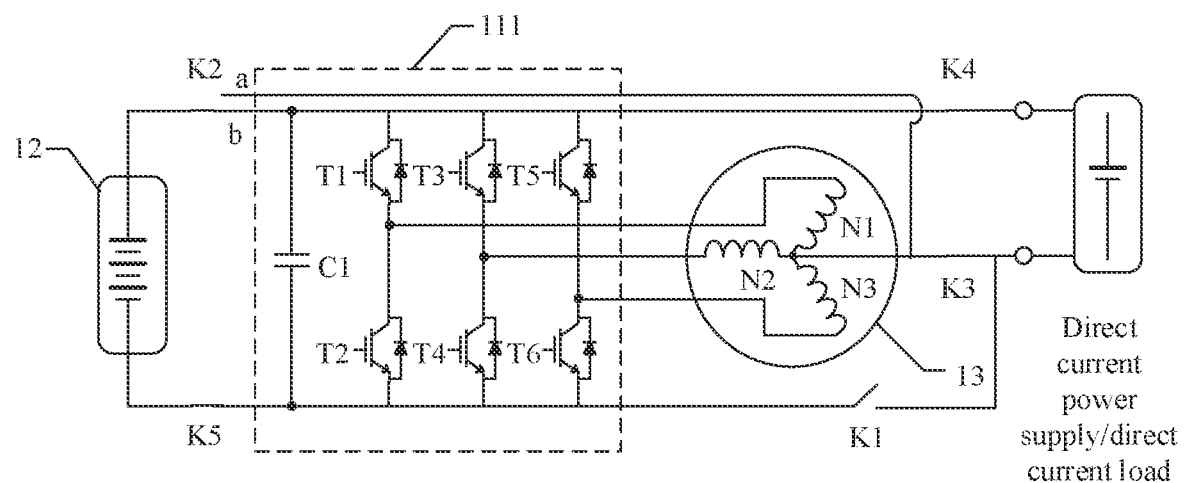
FIG. 14 shows a second switch state of a charging system according to an embodiment of this application.

As shown in FIG. 10, the charging system 11 may further include a switch K3. A first end of the switch K3 is connected to the point connecting the motor windings N1 to N3, and a second end of the switch K3 is connected to the second power supply end. In a boost conversion process, the MCU 111 may turn on the first end and the third end b of the switch K2, turn on the switch K3, and turn off the switch K1. A circuit state may be shown in FIG. 14. It can be learned from FIG. 14 that the circuit state in this case is equivalent to the charging system 11 shown in FIG. 3. Therefore, reference may be made to the boost conversion process provided in Embodiment 1. Details are not described again.

In addition, the charging system 11 shown in FIG. 10 may further support voltage conversion in a buck-boost mode on the power supply voltage. Specifically:

III. Buck-Boost

Figure 15:
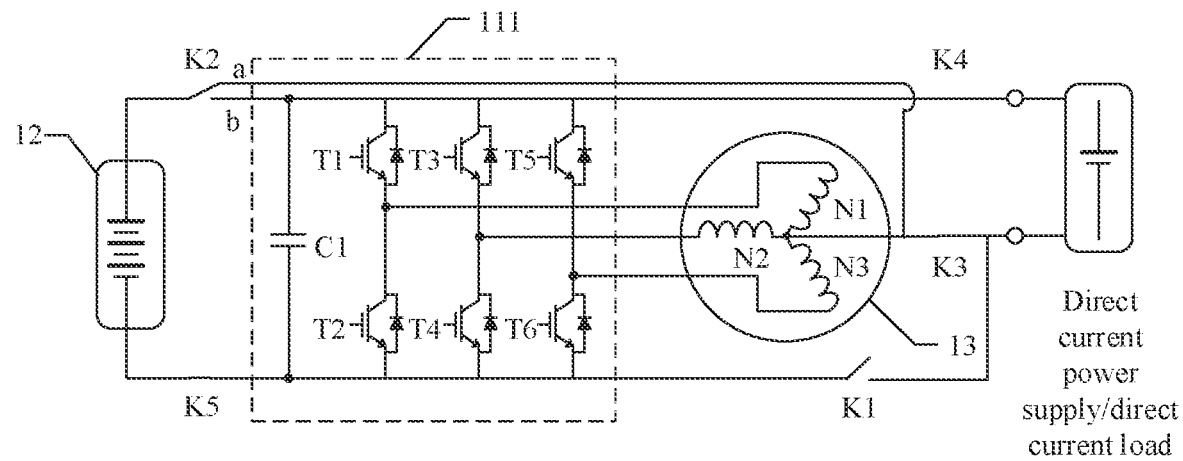
FIG. 15 shows a third switch state of a charging system according to an embodiment of this application.

When buck-boost conversion is performed on the power supply voltage, the MCU 111 may turn on the first end and the second end a of the switch K2, and turn on the switch K3. A circuit state may be shown in FIG. 15. Based on the circuit state shown in FIG. 15, the buck-boost conversion mainly includes the following two stages.

Stage 1: The Motor Winding N3 is Charged.

Figure 16:
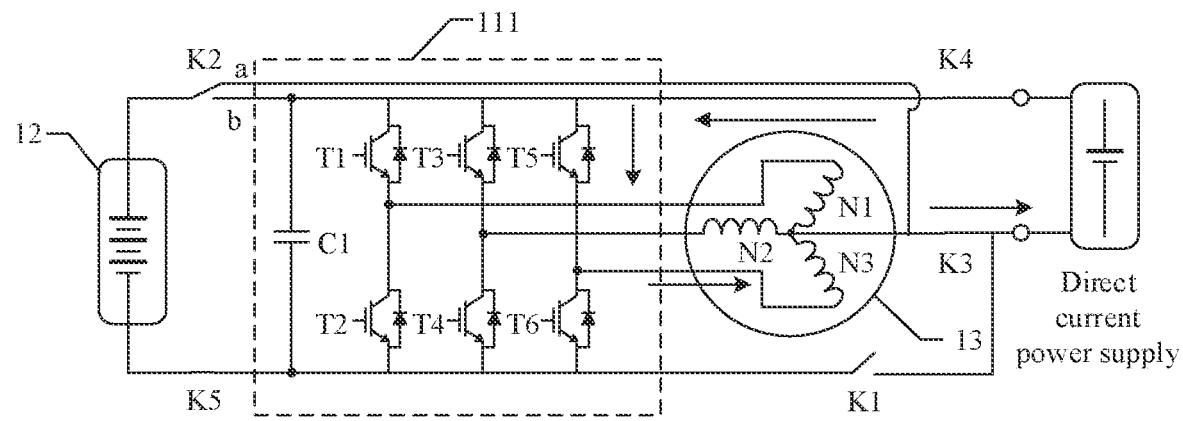
FIG. 16 shows a first buck-boost conversion state of a charging system according to an embodiment of this application.

The MCU 111 turns on the switch transistor T5, so that the motor winding N3 is charged. As shown in FIG. 16, current is output from a positive electrode of the direct current power supply, and flows back to a negative electrode of the direct current power supply after being transmitted by the switch transistor T5 and the motor winding N3, to form a charging loop of the motor winding N3.

Stage 2: The Motor Winding N3 Discharges Electricity.

Figure 17:
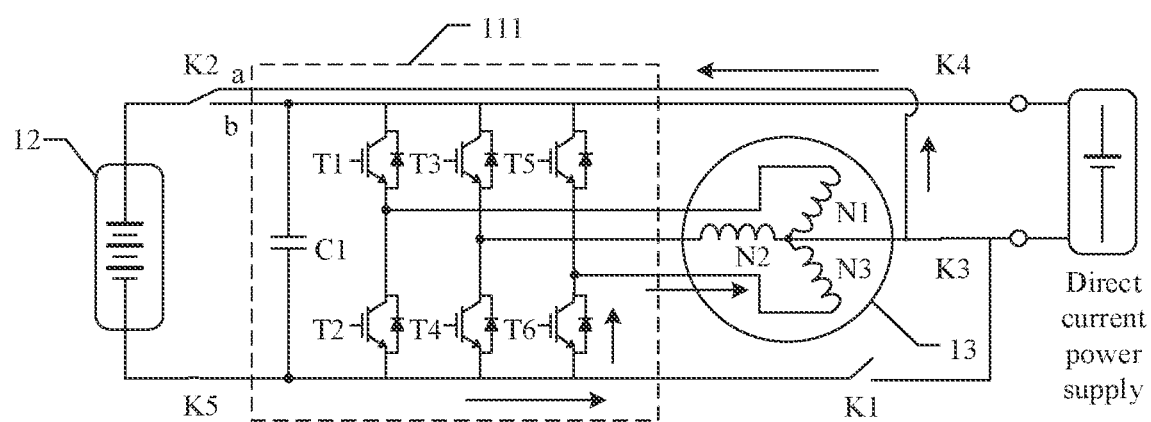
FIG. 17 shows a second buck-boost conversion state of a charging system according to an embodiment of this application.

The MCU 111 turns off the switch transistor T5, so that the motor winding N3 discharges electricity. As shown in FIG. 17, the current is output from an end that is of the motor winding N3 and that is close to the second power supply end, and flows back to an end that is of the motor winding N3 and that is close to the switch transistor T6 after being transmitted by the switch K2, the power battery 12, and a diode in the switch transistor T6. It can be learned that the first output voltage of the charging system 11 is equal to the voltage of the motor winding N3. The MCU 111 can control the voltage of the motor winding N3 by controlling charging time of the motor winding N3 in stage 1, to control the first output voltage. The first output voltage may be greater than the power supply voltage, or may be less than the power supply voltage.

Similar to Embodiment 1, when the power supply voltage of the direct current power supply falls within the charging voltage range of the power battery 12, the MCU 111 may turn on the first end and the third end b of the switch K2, and turn on the switch K1, so that the power battery 12 can directly receive the power supply voltage to complete charging. For specific implementation, refer to Embodiment 1. Details are not described herein again.

Embodiment 4

It should be noted that the charging system 11 shown in FIG. 10 may also support a discharging function of the electric vehicle 10. When the electric vehicle 10 discharges electricity, a connection relationship between the charging system 11 and each of the power battery 12 and a direct current load is similar to that in Embodiment 2. Details are not described again.

Different from Embodiment 2, the charging system 11 provided in FIG. 10 not only can perform buck conversion on a battery voltage, but also can perform boost conversion on the battery voltage, so that both a battery voltage that is output by a high-voltage power battery and a battery voltage that is output by a low-voltage power battery can be adapted to the direct current load in different working voltage ranges.

Next, boost conversion and buck conversion on the battery voltage are separately described by using FIG. 10 as an example.

I. Boost Conversion

In a boost conversion process, the MCU 111 may turn on the switch K1, and turn on the first end and the second end a of the switch K2. A circuit state may be shown in FIG. 11. Based on the circuit state shown in FIG. 11 and using a bridge arm 3 including a switch transistor T5 and a switch transistor T6 as an example, the boost conversion process mainly includes the following two stages.

Stage 1: The Motor Winding N3 is Charged.

Figure 18:
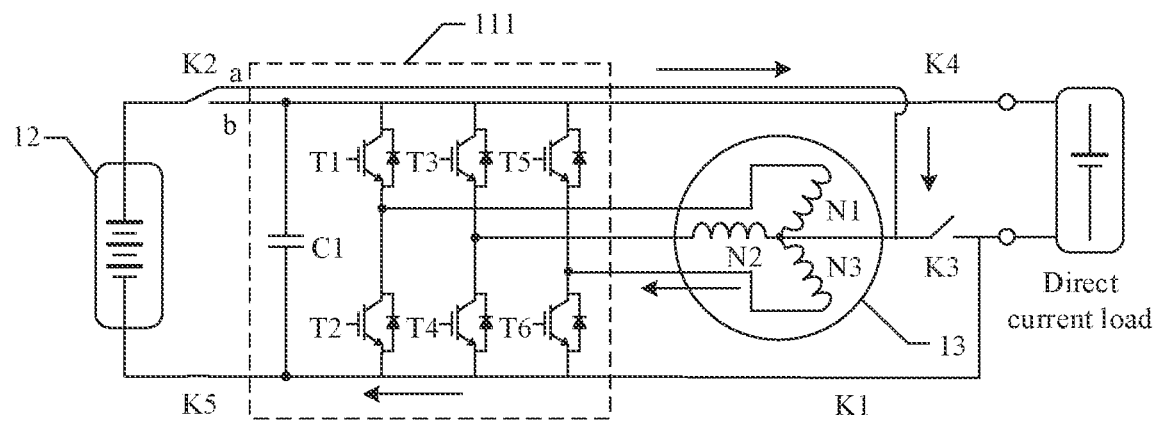
FIG. 18 shows a third boost conversion state of a charging system according to an embodiment of this application.

The MCU 111 turns on the switch transistor T6, so that the motor winding N3 is charged. As shown in FIG. 18, current is output from the positive electrode of the power battery 12, and flows back to the negative electrode of the power battery 12 after being transmitted by the switch K2, the motor winding N3, and the switch transistor 16, to form a charging loop to charge the motor winding N3.

Stage 2: The Motor Winding N3 Discharges Electricity.

Figure 19:
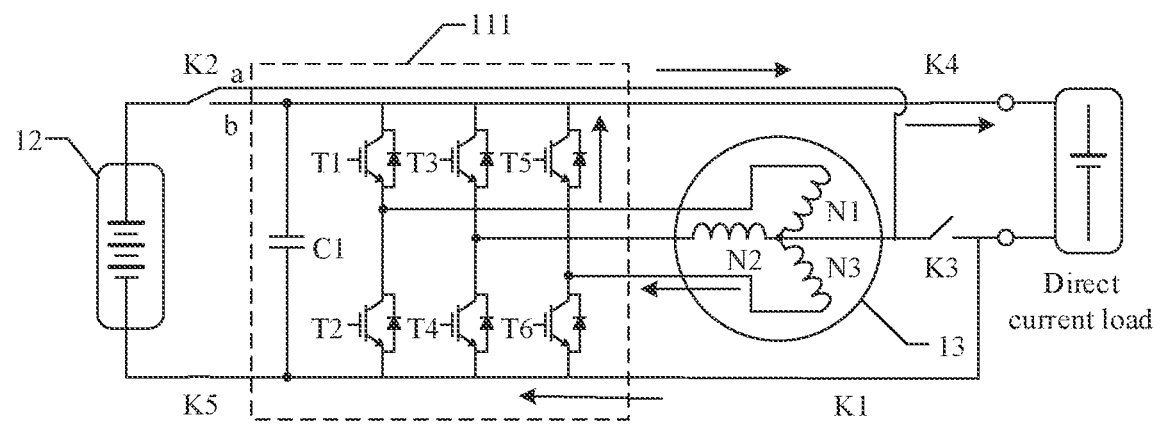
FIG. 19 shows a fourth boost conversion state of a charging system according to an embodiment of this application.

The MCU 111 turns off the switch transistor T6, so that the motor winding N3 discharges electricity. After the MCU 111 turns off the switch transistor T6, the charging loop is turned off. The motor winding N3 discharges electricity due to a freewheeling feature of an inductor. As shown in FIG. 19, the current is output from the positive electrode of the power battery 12, and flows back to the negative electrode of the power battery 12 after being transmitted by the switch K2, the motor winding N3, a diode in the switch transistor T5, and the direct current load. In this process, a second output voltage of the charging system 11 is the sum of the battery voltage of the power battery 12 and a voltage of the motor winding N3. It is clear that the second output voltage is greater than the battery voltage. Therefore, the charging system 11 can implement boost conversion on the battery voltage.

II. Buck Conversion

As shown in FIG. 10, the charging system 11 may further include a switch K3. A first end of the switch K3 is connected to the point connecting the motor windings N1 to N3, and a second end of the switch K3 is connected to the second power supply end. In a buck conversion process, the MCU 111 may turn on the first end and the third end b of the switch K2, turn on the switch K3, and turn off the switch K1. A circuit state may be shown in FIG. 14. It can be learned from FIG. 14 that the circuit state in this case is equivalent to the charging system 11 shown in FIG. 3. Therefore, reference may be made to the buck conversion process provided in Embodiment 2. Details are not described again.

In addition, the charging system 11 shown in FIG. 10 may further support voltage conversion in a buck-boost mode on the battery voltage. Specifically:

III. Buck-Boost

When buck-boost conversion is performed on the battery voltage, the MCU 111 may turn on the first end and the second end a of the switch K2, and turn on the switch K3. A circuit state may be shown in FIG. 15. Based on the circuit state shown in FIG. 15, the buck-boost conversion mainly includes the following two stages.

Stage 1: The Motor Winding N3 is Charged.

Figure 20:
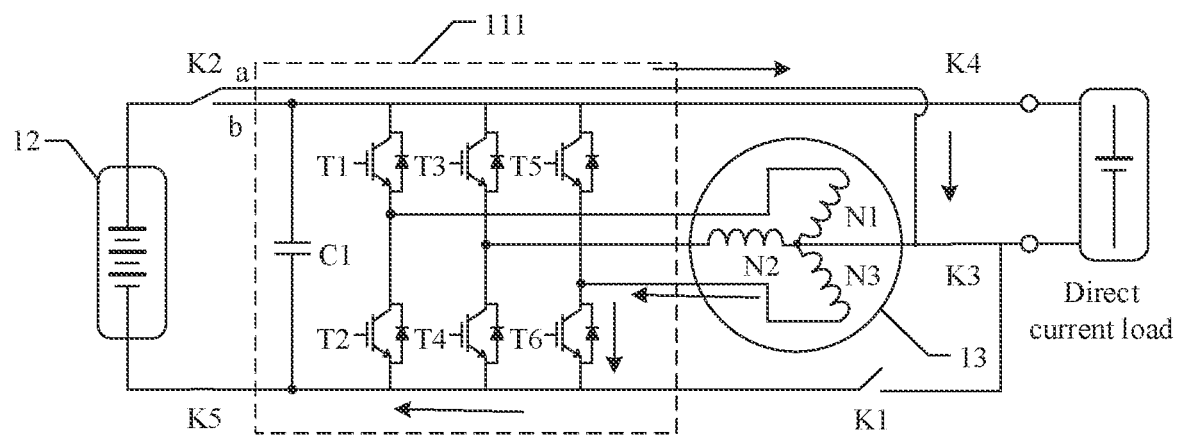
FIG. 20 shows a third buck-boost conversion state of a charging system according to an embodiment of this application.

The MCU 111 turns on the switch transistor T6, so that the motor winding N3 is charged. As shown in FIG. 20, current is output from the positive electrode of the power battery 12, and flows back to the negative electrode of the power battery 12 after being transmitted by the switch K2, the motor winding N3, and the switch transistor T6, to form a charging loop of the motor winding N3.

Stage 2: The Motor Winding N3 Discharges Electricity.

Figure 21:
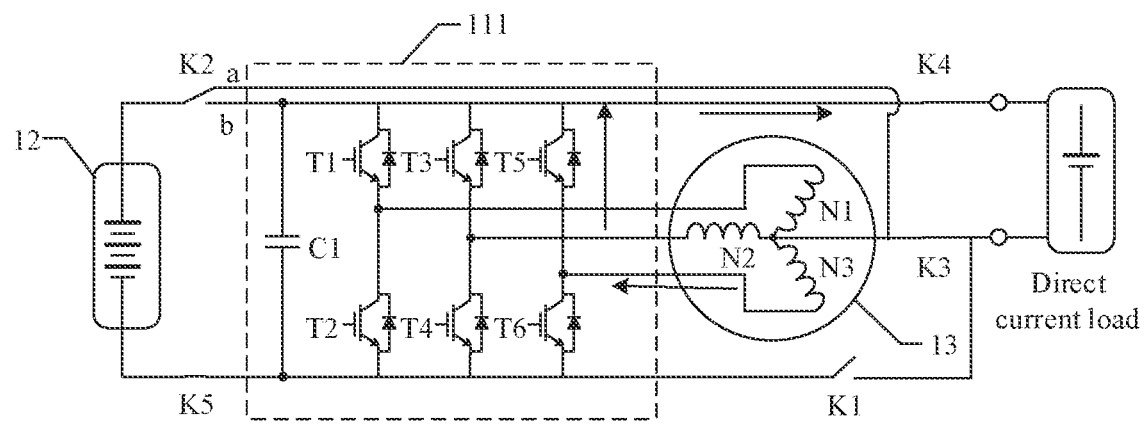
FIG. 21 shows a fourth buck-boost conversion state of a charging system according to an embodiment of this application.

The MCU 111 turns off the switch transistor T6, so that the motor winding N3 discharges electricity. As shown in FIG. 21, the current is output from an end that is of the motor winding N3 and that is close to the switch transistor T5, and flows back to an end that is of the motor winding N3 and that is close to the second power supply end after being transmitted by a diode in the switch transistor T5 and the direct current load. It can be learned that the second output voltage of the charging system 11 is equal to the voltage of the motor winding N3. The MCU 111 can control the voltage of the motor winding N3 by controlling charging time of the motor winding N3 in stage 1, to control the second output voltage. The second output voltage may be greater than the battery voltage, or may be less than the battery voltage.

Similar to Embodiment 2, when the battery voltage of the power battery 12 falls within a working voltage range of the direct current load, the MCU 111 may turn on the first end and the third end b of the switch K2, and turn on the switch K1, so that the power battery 12 can directly provide power to the direct current load. For specific implementation, refer to Embodiment 2. Details are not described herein again.

Embodiment 5

In Embodiment 3 and Embodiment 4, the point connecting the N motor windings are connected to the second power supply end. Based on a similar concept, the point connecting the N motor windings may be connected to the first power supply end. In this case, the charging system 11 may be shown in FIG. 22.

The charging system 11 further includes a switch K5 and a switch K6. The switch K5 is a single-pole double-throw switch, a first end of the switch K5 is connected to the second battery end, a second end a of the switch K5 is connected to the low-potential ends of the N bridge arms, a third end b of the switch K5 is connected to the point connecting the N motor windings, a second end of the switch K6 is connected to the second power supply end, a first end of the switch K6 is connected to the first battery end, and the second end of the switch K6 is connected to the first power supply end.

It should be noted that the switch K5 and the power battery 12 may be independently disposed. In this case, the first end of the switch K5 may be understood as the second battery end of the charging system 11. It can be understood that the switch K5 and the power battery 12 may be integrated into a power battery pack. In this case, it can be considered that the charging system 11 provided in this embodiment of this application includes two second battery ends, where one second battery end is connected to the second end a of the switch K5, and the other second battery end is connected to the third end b of the switch K5.

Figure 22:
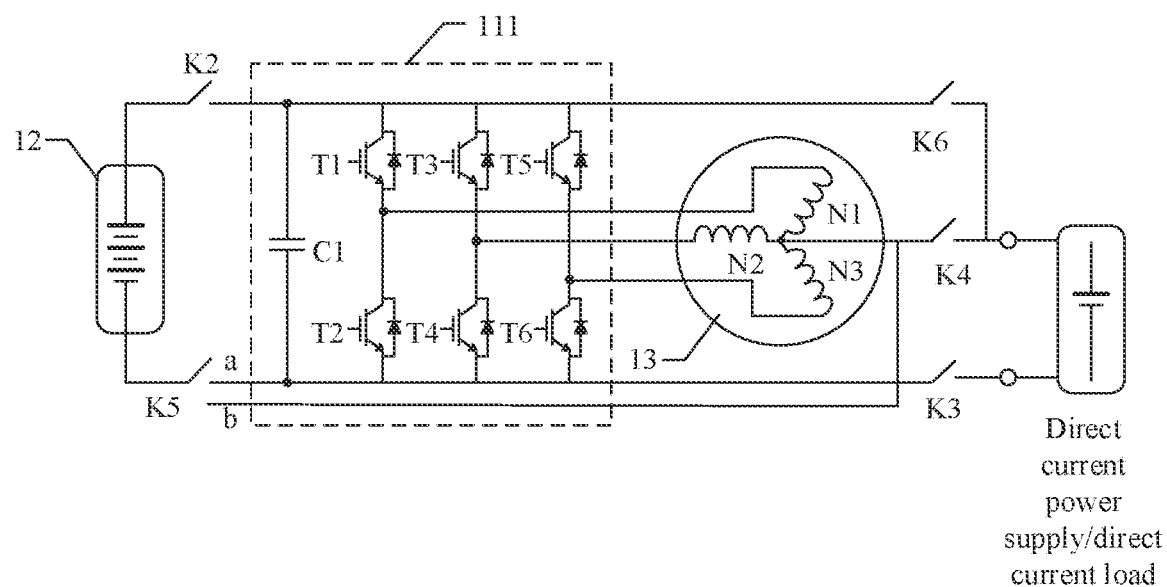
FIG. 22 is a schematic diagram of another charging system according to an embodiment of this application.

Next, buck conversion and boost conversion on the power supply voltage are separately described by using FIG. 22 as an example.

I. Buck Conversion

Figure 23:
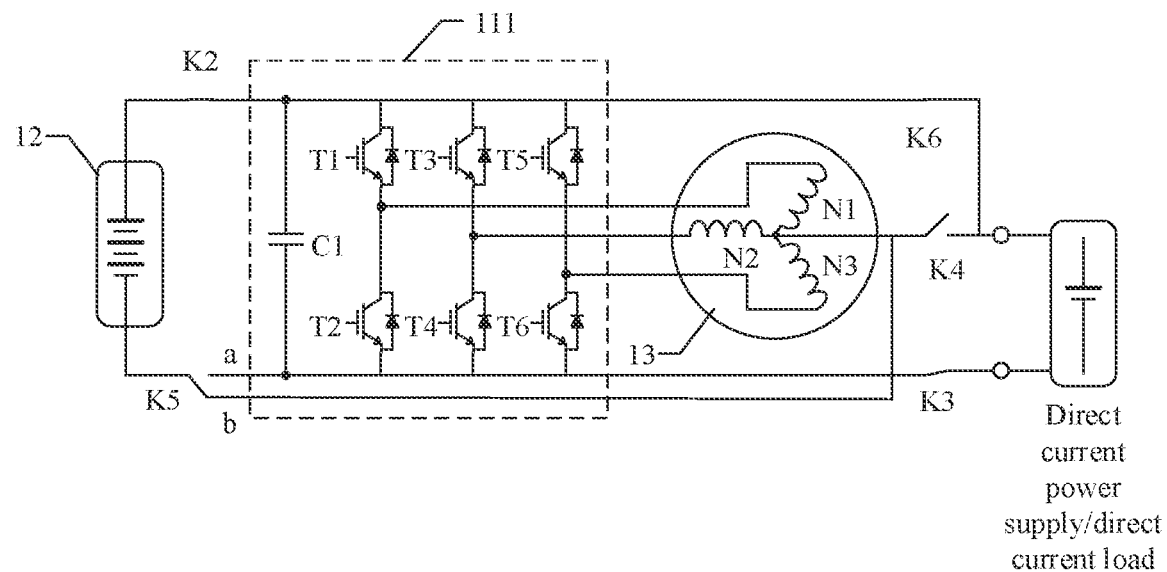
FIG. 23 shows a fourth switch state of a charging system according to an embodiment of this application.

When the power supply voltage is greater than the maximum charging voltage of the power battery 12, the MCU 111 may perform buck conversion on the power supply voltage. In a buck conversion process, the MC U 111 may turn on the switch K6, and turn on the first end and the third end b of the switch K5. A circuit state may be shown in FIG. 23. It should be noted that in some scenarios, a switch K2 to a switch K4 may be further disposed in the charging system 11. In this case, the switch K2 and the switch K3 should remain on and the switch K4 should remain off. Based on the circuit state shown in FIG. 23 and using a bridge arm 3 including a switch transistor T5 and a switch transistor T6 as an example, the buck conversion process mainly includes the following two stages.

Stage 1: The Motor Winding N3 is Charged.

Figure 24:
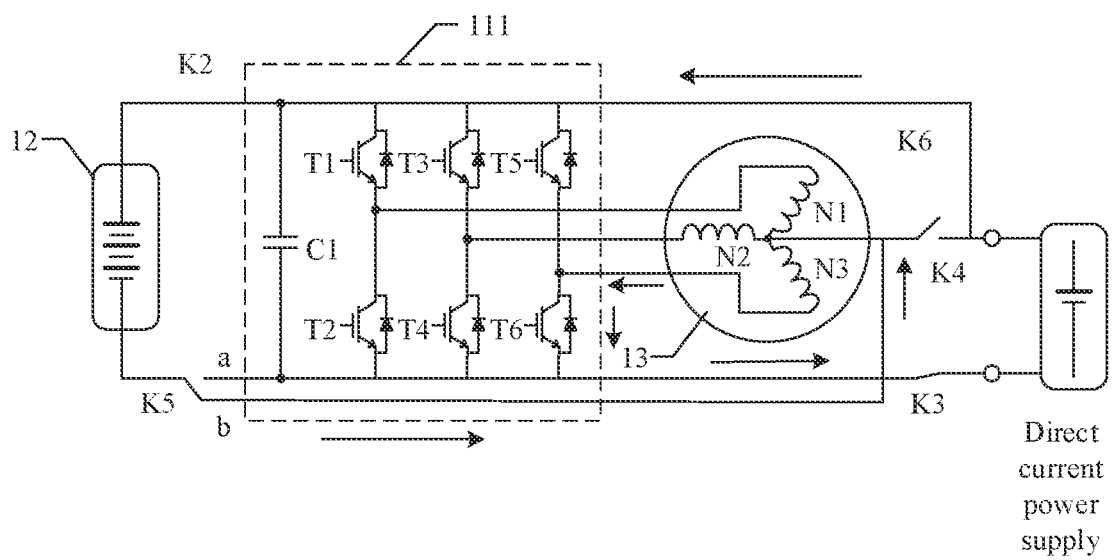
FIG. 24 shows a fifth buck conversion state of a charging system according to an embodiment of this application.

The MCU 111 turns on the switch transistor T6, so that the motor winding N3 is charged. As shown in FIG. 24, current is output from a positive electrode of the direct current power supply, and flows back to a negative electrode of the direct current power supply after being transmitted by the power battery 12, the switch K5, the motor winding N3, and the switch transistor T6, to form a charging loop to charge the motor winding N3. In this process, the first output voltage of the charging system 11 is a difference obtained after a voltage of the motor winding N3 is subtracted from the power supply voltage. It is clear that the first output voltage is less than the power supply voltage. Therefore, the charging system 11 can implement buck conversion.

Stage 2: The Motor Winding N3 Discharges Electricity.

Figure 25:
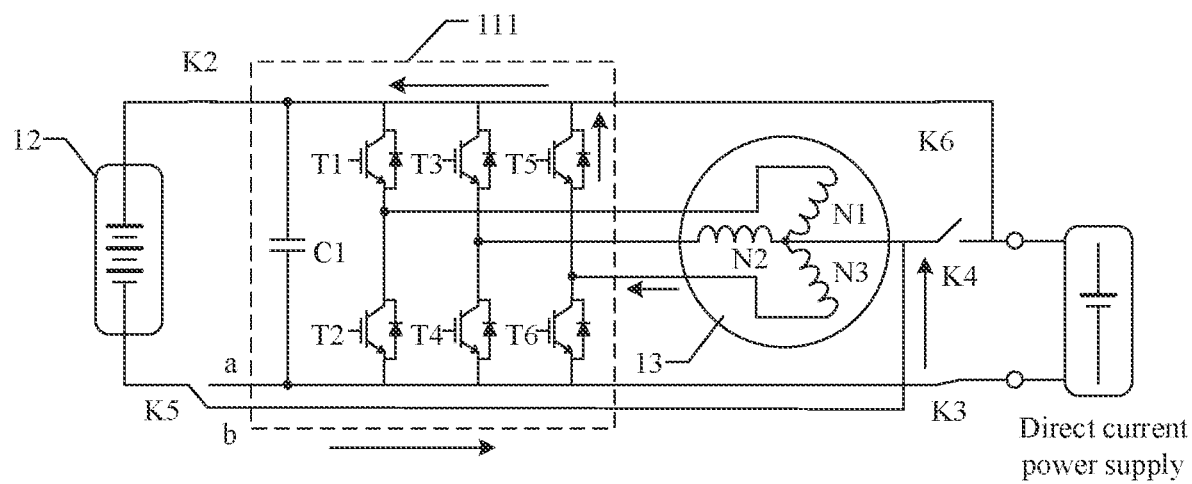
FIG. 25 shows a sixth buck conversion state of a charging system according to an embodiment of this application.

The MCU 111 turns off the switch transistor T6, so that the motor winding N3 discharges electricity; and turns off the second switch transistor, so that the first motor winding discharges electricity. Specifically, after the MCU 111 turns off the switch transistor T6, the charging loop is turned off. The motor winding N3 discharges electricity due to a freewheeling feature of an inductor. As shown in FIG. 25, the current is output from an end that is of the motor winding N3 and that is close to the switch transistor T5, and flows back to an end that is of the motor winding N3 and that is close to the second power supply end after being transmitted by a diode in the switch transistor T5, the power battery 12, and the switch K5. In this process, the first output voltage of the charging system 11 is the voltage of the motor winding N3. It is clear that the first output voltage is less than the power supply voltage. Therefore, the charging system 11 can implement buck conversion on the power supply voltage.

II. Boost Conversion

Figure 26:
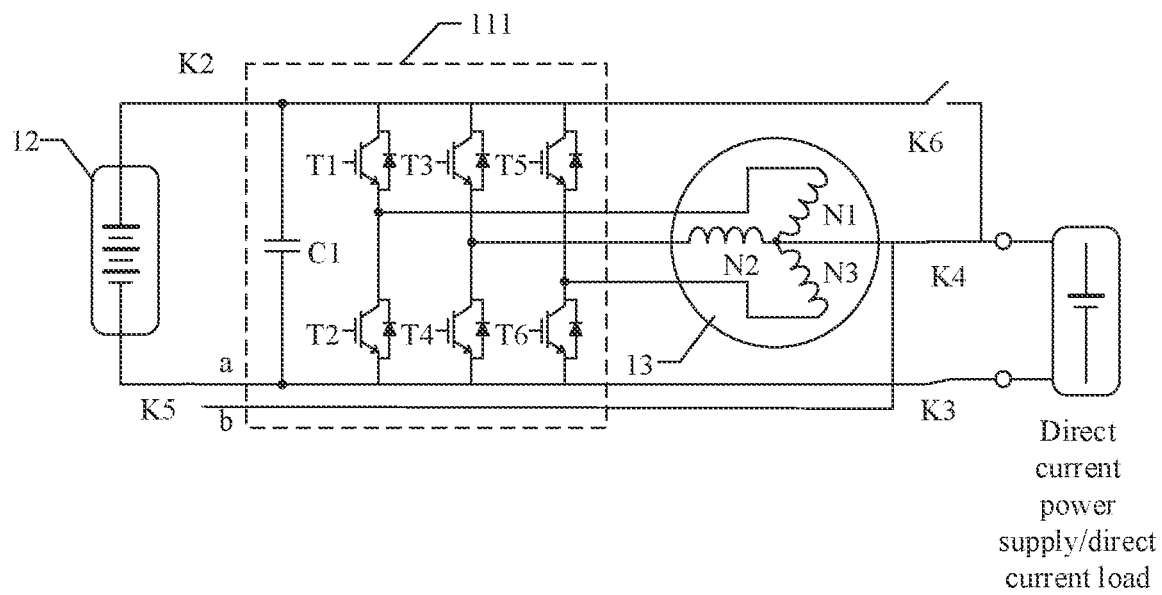
FIG. 26 shows a fifth switch state of a charging system according to an embodiment of this application.

As shown in FIG. 22, the charging system 11 may further include a switch K4. A first end of the switch K4 is connected to the point connecting the N motor windings, and a second end of the switch K4 is connected to the first power supply end. In a boost conversion process, the MCU 111 may turn on the first end and the second end a of the switch K5, turn on the switch K4, and turn off the switch K6. A circuit state may be shown in FIG. 26. It can be learned from FIG. 26 that the circuit state in this case is equivalent to the charging system 11 shown in FIG. 3. Therefore, reference may be made to the boost conversion process provided in Embodiment 1. Details are not described again.

In addition, the charging system 11 shown in FIG. 22 may further support voltage conversion in a buck-boost mode on the power supply voltage. Specifically:

III. Buck-Boost

Figure 27:
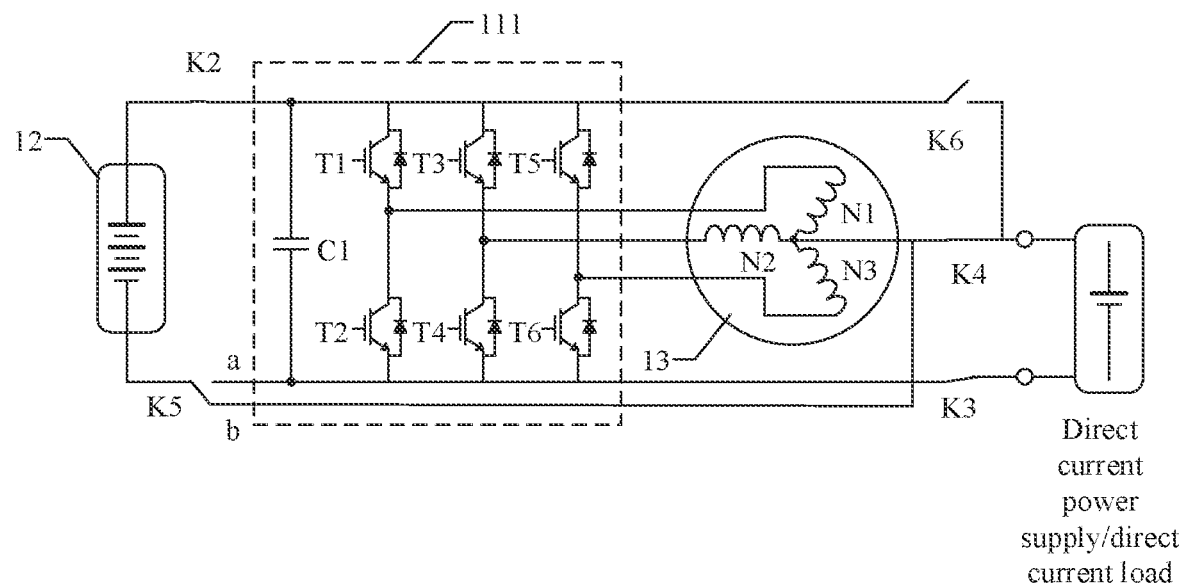
FIG. 27 shows a sixth switch state of a charging system according to an embodiment of this application.

When buck-boost conversion is performed on the power supply voltage, the MCU 111 may turn on the first end and the third end b of the switch K5, and turn on the switch K4. A circuit state may be shown in FIG. 27. Based on the circuit state shown in FIG. 27, the buck-boost conversion mainly includes the following two stages.

Stage 1: The Motor Winding N3 is Charged.

Figure 28:
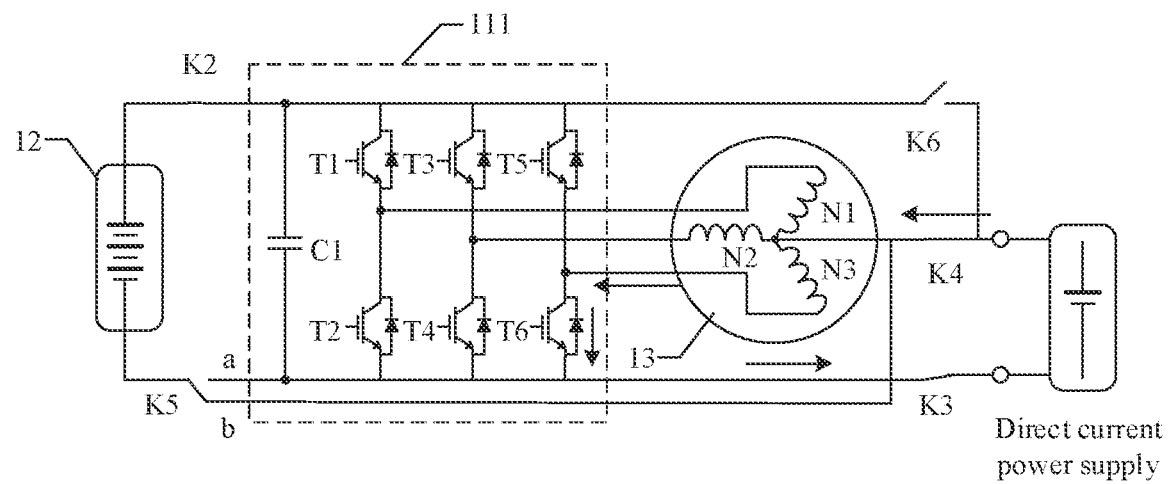
FIG. 28 shows a fifth buck-boost conversion state of a charging system according to an embodiment of this application.

The MCU 111 turns on the switch transistor T6, so that the motor winding N3 is charged. As shown in FIG. 28, current is output from a positive electrode of the direct current power supply, and flows back to a negative electrode of the direct current power supply after being transmitted by the motor winding N3 and the switch transistor T6, to form a charging loop of the motor winding N3.

Stage 2: The Motor Winding N3 Discharges Electricity.

Figure 29:
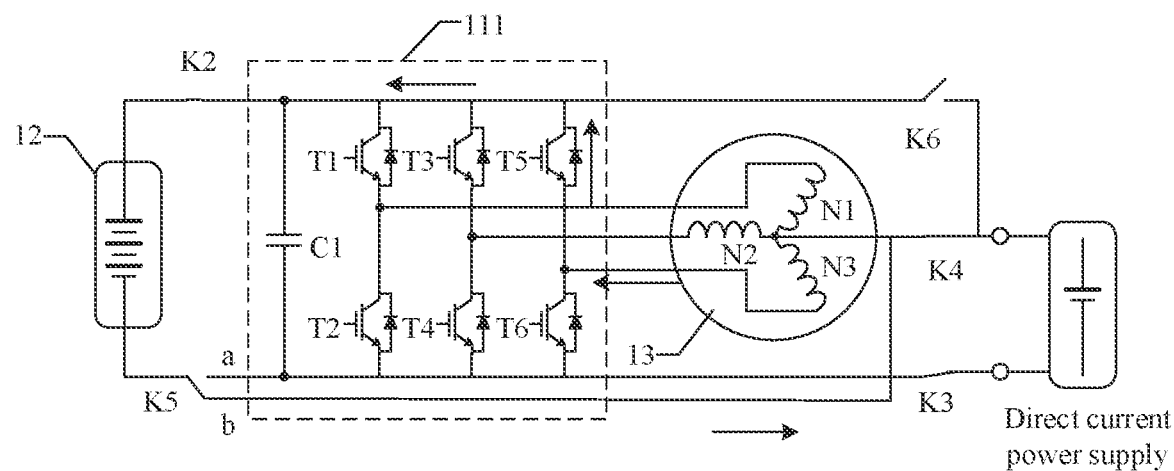
FIG. 29 shows a sixth buck-boost conversion state of a charging system according to an embodiment of this application.

The MCU 111 turns off the switch transistor T5, so that the motor winding N3 discharges electricity. As shown in FIG. 29, the current is output from an end that is of the motor winding N3 and that is close to the switch transistor T5, and flows back to an end that is of the motor winding N3 and that is close to the first power supply end after being transmitted by a diode in the switch transistor T5, the power battery 12, and the switch K5. It can be learned that the first output voltage of the charging system 11 is equal to the voltage of the motor winding N3. The MCU 111 can control the voltage of the motor winding N3 by controlling charging time of the motor winding N3 in stage 1, to control the first output voltage. The first output voltage may be greater than the power supply voltage, or may be less than the power supply voltage.

Similar to Embodiment 1, when the power supply voltage of the direct current power supply falls within the charging voltage range of the power battery 12, the MCU 111 may turn on the first end and the second end a of the switch K5, and turn on the switch K6, so that the power battery 12 can directly receive the power supply voltage to complete charging. For specific implementation, refer to Embodiment 1. Details are not described herein again.

Embodiment 6

It should be noted that the charging system 11 shown in FIG. 22 not only can perform buck conversion on a battery voltage, but also can perform boost conversion on the battery voltage, so that both a battery voltage that is output by a high-voltage power battery and a battery voltage that is output by a low-voltage power battery can be adapted to the direct current load in different working voltage ranges.

Next, boost conversion and buck conversion on the battery voltage are separately described by using FIG. 22 as an example.

I. Boost Conversion

In a boost conversion process, the MCU 111 may turn on the switch K6, and turn on the first end and the third end b of the switch K5. A circuit state may be shown in FIG. 23. Based on the circuit state shown in FIG. 23 and using a bridge arm 3 including a switch transistor T5 and a switch transistor T6 as an example, the boost conversion process mainly includes the following two stages.

Stage 1: The Motor Winding N3 is Charged.

Figure 30:
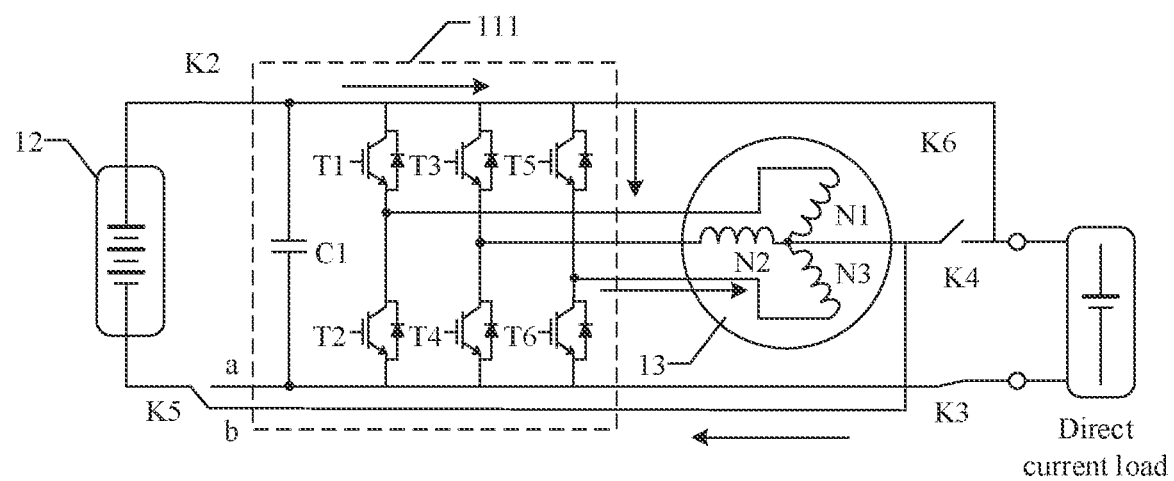
FIG. 30 shows a fifth boost conversion state of a charging system according to an embodiment of this application.

The MCU 111 turns on the switch transistor T5, so that the motor winding N3 is charged. As shown in FIG. 30, current is output from the positive electrode of the power battery 12, and flows back to the negative electrode of the power battery 12 after being transmitted by the switch transistor T5, the motor winding N3, and the switch K5, to form a charging loop to charge the motor winding N3.

Stage 2: The Motor Winding N3 Discharges Electricity.

Figure 31:
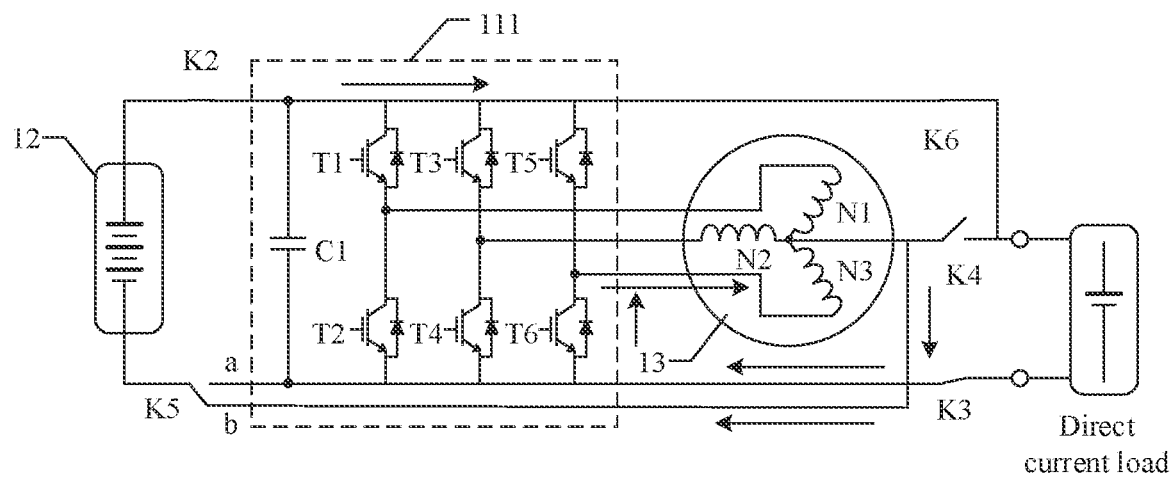
FIG. 31 shows a sixth boost conversion state of a charging system according to an embodiment of this application.

The MCU 111 turns off the switch transistor T5, so that the motor winding N3 discharges electricity. After the MCU 111 turns off the switch transistor T5, the charging loop is turned off. The motor winding N3 discharges electricity due to a freewheeling feature of an inductor. As shown in FIG. 31, the current is output from the positive electrode of the power battery 12, and flows back to the negative electrode of the power battery 12 after being transmitted by the direct current load, a diode in the switch transistor T6, the motor winding N3, and the switch K5. In this process, a second output voltage of the charging system 11 is the sum of the battery voltage of the power battery 12 and a voltage of the motor winding N3. It is clear that the second output voltage is greater than the battery voltage. Therefore, the charging system 11 can implement boost conversion on the battery voltage.

II. Buck Conversion

As shown in FIG. 22, the charging system 11 may further include a switch K4. A first end of the switch K4 is connected to the point connecting the N motor windings, and a second end of the switch K4 is connected to the first power supply end. In a buck conversion process, the MCU 111 may turn on the first end and the second end a of the switch K5, turn on the switch K4, and turn off the switch K6. A circuit state may be shown in FIG. 26. It can be learned from FIG. 26 that the circuit state in this case is equivalent to the charging system 11 shown in FIG. 3. Therefore, reference may be made to the buck conversion process provided in Embodiment 2. Details are not described again.

In addition, the charging system 11 shown in FIG. 22 may also support voltage conversion in a buck-boost mode on the battery voltage. Specifically:

III. Buck-Boost

When buck-boost conversion is performed on the battery voltage, the MCU 111 may turn on the first end and the third end b of the switch K5, and turn on the switch K4. A circuit state may be shown in FIG. 27. Based on the circuit state shown in FIG. 27, the buck-boost conversion mainly includes the following two stages.

Stage 1: The Motor Winding N3 is Charged.

Figure 32:
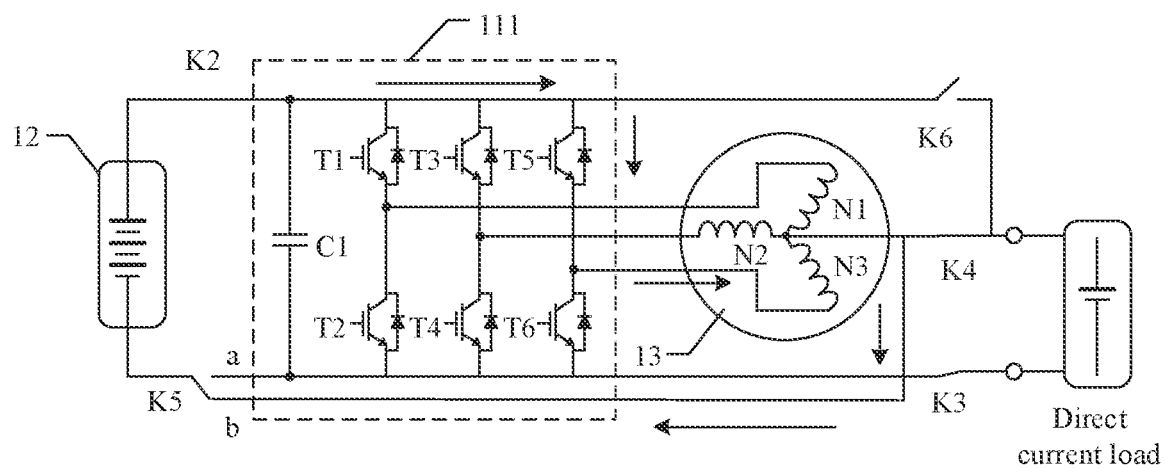
FIG. 32 shows a seventh buck-boost conversion state of a charging system according to an embodiment of this application.

The MCU 111 turns on the switch transistor T5, so that the motor winding N3 is charged. As shown in FIG. 32, current is output from the positive electrode of the power battery 12, and flows back to the negative electrode of the power battery 12 after being transmitted by the switch transistor T5, the motor winding N3, and the switch K5, to form a charging loop of the motor winding N3.

Stage 2: The Motor Winding N3 Discharges Electricity.

Figure 33:
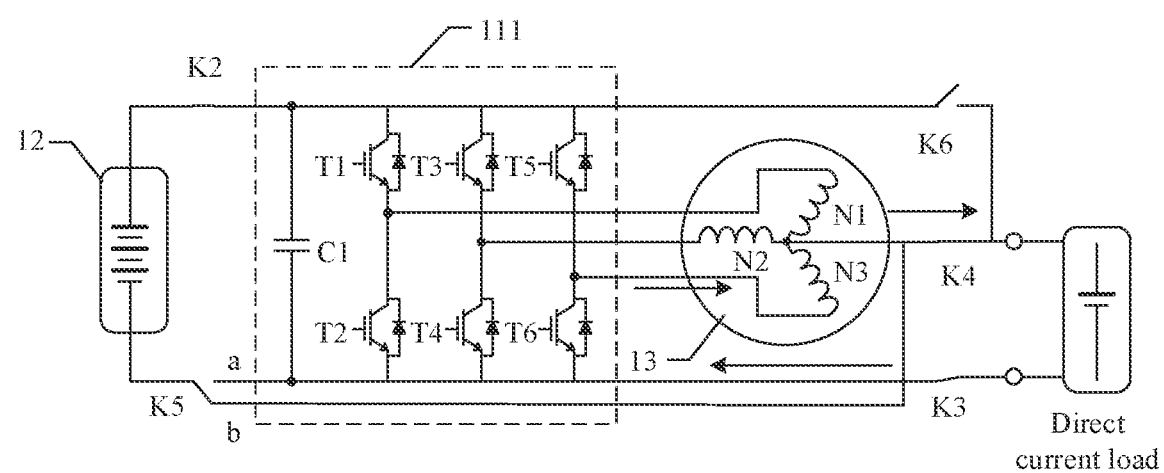
FIG. 33 shows an eighth buck-boost conversion state of a charging system according to an embodiment of this application.

The MCU 111 turns off the switch transistor T5, so that the motor winding N3 discharges electricity. As shown in FIG. 33, the current is output from an end that is of the motor winding N3 and that is close to the first power supply end, and flows back to an end that is of the motor winding N3 and that is close to the switch transistor T6 after being transmitted by the direct current load and a diode in the switch transistor T6. It can be learned that the second output voltage of the charging system 11 is equal to the voltage of the motor winding N3. The MCU 111 can control the voltage of the motor winding N3 by controlling charging time of the motor winding N3 in stage 1, to control the second output voltage. The second output voltage may be greater than the battery voltage, or may be less than the battery voltage.

Similar to Embodiment 2, when the battery voltage of the power battery 12 falls within a working voltage range of the direct current load, the MCU 111 may turn on the first end and the second end a of the switch K5, and turn on the switch K6, so that the power battery 12 can directly provide power to the direct current load. For specific implementation, refer to Embodiment 2. Details are not described herein again.

It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A charging system, comprising:
   a motor control unit (MCU) and a motor, wherein the MCU comprises N bridge arms, the motor comprises N motor windings, the N bridge arms are respectively connected to the N motor windings in a one-to-one correspondence, and N is an integer greater than or equal to one,
   wherein high-potential ends of the N bridge arms are connected to one end of a first switch,
   wherein a second switch is a single-pole double-throw switch, wherein the second switch has a first end that is a single-pole end of the single-pole double-throw switch, and a second end of the single-pole double-throw switch is a double-throw end including a second end and a third end of the second switch, and the high-potential ends of the N bridge arms are also connected to the third end of the second switch,
   wherein a second end of the first switch is connected to a first power supply end and the first end of the second switch is connected to a first battery end of the charging system, the first power supply end is configured to connect to a positive electrode of a direct current power supply, the first battery end is configured to connect to a positive electrode of a power battery, the direct current power supply is configured to output a power supply voltage, and the power battery is configured to receive a first output voltage of the charging system;
   low-potential ends of the N bridge arms are connected to one end of a third switch and to one end of a fourth switch, the other end of the third switch is connected to a second battery end of the charging system and the other end of the fourth switch is connected to a second power supply end of the charging system, and the second battery end is configured to connect to a negative electrode of the power battery;
   one end of each of the N motor windings is connected to a middle point of a corresponding bridge arm, the other end of each of the N motor windings is connected to one end of a first inductor and to the second end of the second switch, the other end of the first inductor is connected to one end of a fifth switch, the other end of the fifth switch is connected to the second power supply end of the charging system, and the second power supply end is configured to connect to a negative electrode of the direct current power supply; and
   the N bridge arms and the N motor windings constitute a voltage conversion circuit, and the MCU is configured to:
   when the power supply voltage is less than a minimum charging voltage of the power battery, perform boost conversion on the power supply voltage by using the voltage conversion circuit, and output the power supply voltage obtained after boost conversion to the power battery as the first output voltage, wherein the first output voltage is greater than or equal to the minimum charging voltage,
   wherein any of the N bridge arms is a first bridge arm, the first bridge arm comprises a first switch transistor and a second switch transistor, a first electrode of the first switch transistor is separately connected to the first battery end and the first power supply end, a second electrode of the first switch transistor is connected to a first electrode of the second switch transistor, and the middle point is located between the first switch transistor and the second switch transistor; and
   when the power supply voltage is less than the minimum charging voltage of the power battery, the MCU is configured to:
   turn on the first switch transistor, so that a first motor winding correspondingly connected to the first bridge arm is charged; and
   turn off the first switch transistor, so that the first motor winding discharges electricity,
   wherein the MCU is further configured to:
   when the power supply voltage is greater than a maximum charging voltage of the power battery, perform buck conversion on the power supply voltage by using the voltage conversion circuit, and output the power supply voltage obtained after buck conversion to the power battery as the first output voltage, wherein the first output voltage is less than or equal to the maximum charging voltage,
   wherein when the power supply voltage is greater than the maximum charging voltage of the power battery, the MCU is specifically configured to:
   turn on the fourth switch, turn on the first end and the second end of the second switch, and turn off the fifth switch;
   turn on the first switch transistor, so that a first motor winding correspondingly connected to the first bridge arm is charged; and
   turn off the first switch transistor, so that the first motor winding discharges electricity,
   and wherein when the power supply voltage is less than the minimum charging voltage of the power battery, the MCU is configured to:
   turn on the first end and the third end of the second switch, turn on the fifth switch, and turn off the fourth switch;

turn on the first switch transistor, so that the first motor winding corresponding to the first bridge arm is charged; and turn off the first switch transistor, so that the first motor winding discharges electricity.

2. The charging system according to claim 1, wherein the MCU is further configured to:

turn on the fourth switch when the power supply voltage falls within a charging voltage range of the power battery; and turn off the fourth switch when the power supply voltage is above the charging voltage range of the power battery.

3. The charging system according to claim 2, wherein the MCU is further configured to:

when the power supply voltage falls within the charging voltage range of the power battery, also turn on the first end and the third end of the second switch.

4. A charging system, comprising:

a motor control unit (MCU) and a motor, wherein the MCU comprises N bridge arms, the motor comprises N motor windings, the N bridge arms are respectively connected to the N motor windings in a one-to-one correspondence, and N is an integer greater than or equal to one, wherein high-potential ends of the N bridge arms are connected to one end of a first switch, wherein a second switch is a single-pole double-throw switch, wherein the second switch has a first end that is a single-pole end of the single-pole double-throw switch, and a second end of the single-pole double-throw switch is a double-throw end including a second end and a third end of the second switch, and the high-potential ends of the N bridge arms are also connected to the third end of the second switch, wherein a second end of the first switch is connected to a first power supply end and the first end of the second switch is connected to a first power supply end and a first battery end of the charging system, the first power supply end is configured to connect to a positive electrode of a direct current load, the first battery end is configured to connect to a positive electrode of a power battery, the direct current load is configured to receive a first output voltage of the charging system, and the power battery is configured to output a battery voltage to the charging system;

low-potential ends of the N bridge arms are connected to one end of a third switch and to one end of a fourth switch, the other end of the third switch is connected to a second battery end of the charging system and the other end of the fourth switch is connected to a second power supply end of the charging system, and the second battery end is configured to connect to a negative electrode of the power battery;

one end of each of the N motor windings is connected to a middle point of a corresponding bridge arm, the other end of each of the N motor windings is connected to one end of a first inductor and to the second end of the second switch, the other end of the first inductor is connected to one end of a fifth switch, the other end of the fifth switch is connected to the second power supply end of the charging system, and the second power supply end is configured to connect to a negative electrode of the direct current load; and the N bridge arms and the N motor windings constitute a voltage conversion circuit, and the MCU is configured to:

when the battery voltage is greater than a maximum working voltage of the direct current load, perform buck conversion on the battery voltage by using the voltage conversion circuit, and output the battery voltage obtained after buck conversion to the direct current load as the second output voltage, wherein the first output voltage greater than or equal to the maximum working voltage, wherein any of the N bridge arms is a first bridge arm, the first bridge arm comprises a first switch transistor and a second switch transistor, a first electrode of the first switch transistor is separately connected to the first battery end and the first power supply end, a second electrode of the first switch transistor is connected to a first electrode of the second switch transistor, and the middle point is located between the first switch transistor and the second switch transistor; and when the power supply voltage is less than the minimum charging voltage of the power battery, the MCU is configured to:

turn on the first switch transistor, so that a first motor winding correspondingly connected to the first bridge arm is charged; and turn off the first switch transistor, so that the first motor winding discharges electricity, wherein the MCU is further configured to:

when the power supply voltage is greater than a maximum charging voltage of the power battery, perform buck conversion on the power supply voltage by using the voltage conversion circuit, and output the power supply voltage obtained after buck conversion to the power battery as the first output voltage, wherein the first output voltage is less than or equal to the maximum charging voltage, wherein when the power supply voltage is greater than the maximum charging voltage of the power battery, the MCU is specifically configured to:

turn on the fourth switch, turn on the first end and the second end of the second switch, and turn off the fifth switch;

turn on the first switch transistor, so that a first motor winding correspondingly connected to the first bridge arm is charged; and turn off the first switch transistor, so that the first motor winding discharges electricity, and wherein when the power supply voltage is less than the minimum charging voltage of the power battery, the MCU is configured to:

turn on the first end and the third end of the second switch, turn on the fifth switch, and turn off the fourth switch;

turn on the first switch transistor, so that the first motor winding corresponding to the first bridge arm is charged; and turn off the first switch transistor, so that the first motor winding discharges electricity.

5. The charging system according to claim 4, wherein the MCU is further configured to:

turn on the first switch when the battery voltage falls within a working voltage range of the direct current load; and turn off the first switch when the battery voltage is above the working voltage range of the direct current load.

6. The charging system according to claim 5, wherein the MCU is further configured to:
  when the battery voltage falls within the working voltage range of the direct current load, also turn on the first end and the third end of the second switch, and turn on the first switch.

\* \* \* \* \*

UNITED STATES PATENT AND TRADEMARK OFFICE
CERTIFICATE OF CORRECTION

| | |
|---|---|
| PATENT NO. | : 11,791,649 B2 |
| APPLICATION NO. | : 17/580841 |
| DATED | : October 17, 2023 |
| INVENTOR(S) | : Yang Cheng et al. |

It is certified that error appears in the above-identified patent and that said Letters Patent is hereby corrected as shown below:

In the Claims

In Column 32, Line 7, in Claim 4, after "voltage" insert -- is --.

Signed and Sealed this
Thirteenth Day of August, 2024

Katherine Kelly Vidal
*Director of the United States Patent and Trademark Office*